US012509026B2

United States Patent
Tu et al.

(10) Patent No.: US 12,509,026 B2
(45) Date of Patent: Dec. 30, 2025

(54) SYSTEM AND METHOD FOR CLEANING SENSORS OF AUTONOMOUS VEHICLES

(71) Applicant: GM Cruise Holdings LLC, San Francisco, CA (US)

(72) Inventors: Hongen Tu, Santa Clara, CA (US); Wesley Newhouse, San Francisco, CA (US); Brian Gilbert, Fairfax, CA (US); Devin Cass, San Francisco, CA (US); Jason Seitz, Oakland, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 720 days.

(21) Appl. No.: 17/815,981

(22) Filed: Jul. 29, 2022

(65) Prior Publication Data

US 2024/0034279 A1    Feb. 1, 2024

(51) Int. Cl.
B60S 1/56    (2006.01)

(52) U.S. Cl.
CPC ...................................... B60S 1/56 (2013.01)

(58) Field of Classification Search
CPC .......... B60S 1/56; G01S 7/497; G01S 17/931; G01S 2007/4977; G02B 27/0006
See application file for complete search history.

(56) References Cited

U.S. PATENT DOCUMENTS

| | | | |
|---|---|---|---|
| 4,846,425 A * | 7/1989 | Champetier | B64G 1/54 134/1 |
| 7,810,511 B2 * | 10/2010 | Fagrenius | G02B 27/0006 396/419 |
| 8,485,741 B1 * | 7/2013 | Bunn | G03B 19/16 348/217.1 |
| 8,805,550 B2 * | 8/2014 | Chemel | H05B 47/155 700/297 |
| 8,829,886 B2 * | 9/2014 | Weaver | G01N 23/227 324/96 |
| 10,725,157 B1 * | 7/2020 | Yates | G01S 7/4816 |

(Continued)

OTHER PUBLICATIONS

JP 3873238 (Year: 2007).*
JP 2019-136699 (Year: 2019).*
FR 3117384 (Year: 2022).*

*Primary Examiner* — Alexander Markoff
(74) *Attorney, Agent, or Firm* — CANTOR COLBURN LLP

(57) ABSTRACT

An AV sensor can be cleaned by charging a conductive layer over a sensor surface. The conductive layer may be positively or negatively charged and can repel contaminants having the same polarity away from the sensor. The charging of the conductive layer can be triggered by a determination that the sensor needs cleaning, which can be based on sensor data captured by the sensor or a different sensor. The charging of the conductive layer may include one or more charging cycles, each of which includes charging the conductive layer with two opposing polarities. Another conductive layer may be over the conductive layer. The other conductive layer can be charged with an opposite polarity from the conductive layer so that an electric field is present between the two conductive layers. A piezoelectric layer between the two conductive layers can vibrate under the electric field. The vibration can enhance the cleaning.

17 Claims, 11 Drawing Sheets

(56) References Cited

U.S. PATENT DOCUMENTS

| | | | | |
|---|---|---|---|---|
| 2012/0243093 | A1* | 9/2012 | Tonar | H10N 30/20 |
| | | | | 359/507 |
| 2014/0283316 | A1* | 9/2014 | Chang | G01N 21/15 |
| | | | | 15/1.51 |
| 2015/0036037 | A1* | 2/2015 | Reed | G03B 17/02 |
| | | | | 348/340 |
| 2018/0009418 | A1* | 1/2018 | Newman | B08B 1/16 |
| 2019/0106085 | A1* | 4/2019 | Bacchus | G02B 27/0006 |
| 2023/0211755 | A1* | 7/2023 | Wachter | G01S 7/4813 |
| | | | | 701/36 |
| 2023/0415704 | A1* | 12/2023 | Lee | B60S 1/26 |
| 2024/0034279 | A1* | 2/2024 | Tu | G02B 27/0006 |

* cited by examiner

SYSTEM AND METHOD FOR CLEANING SENSORS OF AUTONOMOUS VEHICLES

TECHNICAL FIELD OF THE DISCLOSURE

The present disclosure relates generally to autonomous vehicles (AVs) and, more specifically, to cleaning sensors of AVs.

BACKGROUND

An AV is a vehicle that is capable of sensing and navigating its environment with little or no user input. An autonomous vehicle may sense its environment using sensing devices such as Radio Detection and Ranging (RADAR), Light Detection and Ranging (LIDAR), image sensors, cameras, and the like. An autonomous vehicle system may also use information from a global positioning system (GPS), navigation systems, vehicle-to-vehicle communication, vehicle-to-infrastructure technology, and/or drive-by-wire systems to navigate the vehicle. As used herein, the phrase "autonomous vehicle" includes both fully autonomous and semi-autonomous vehicles.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
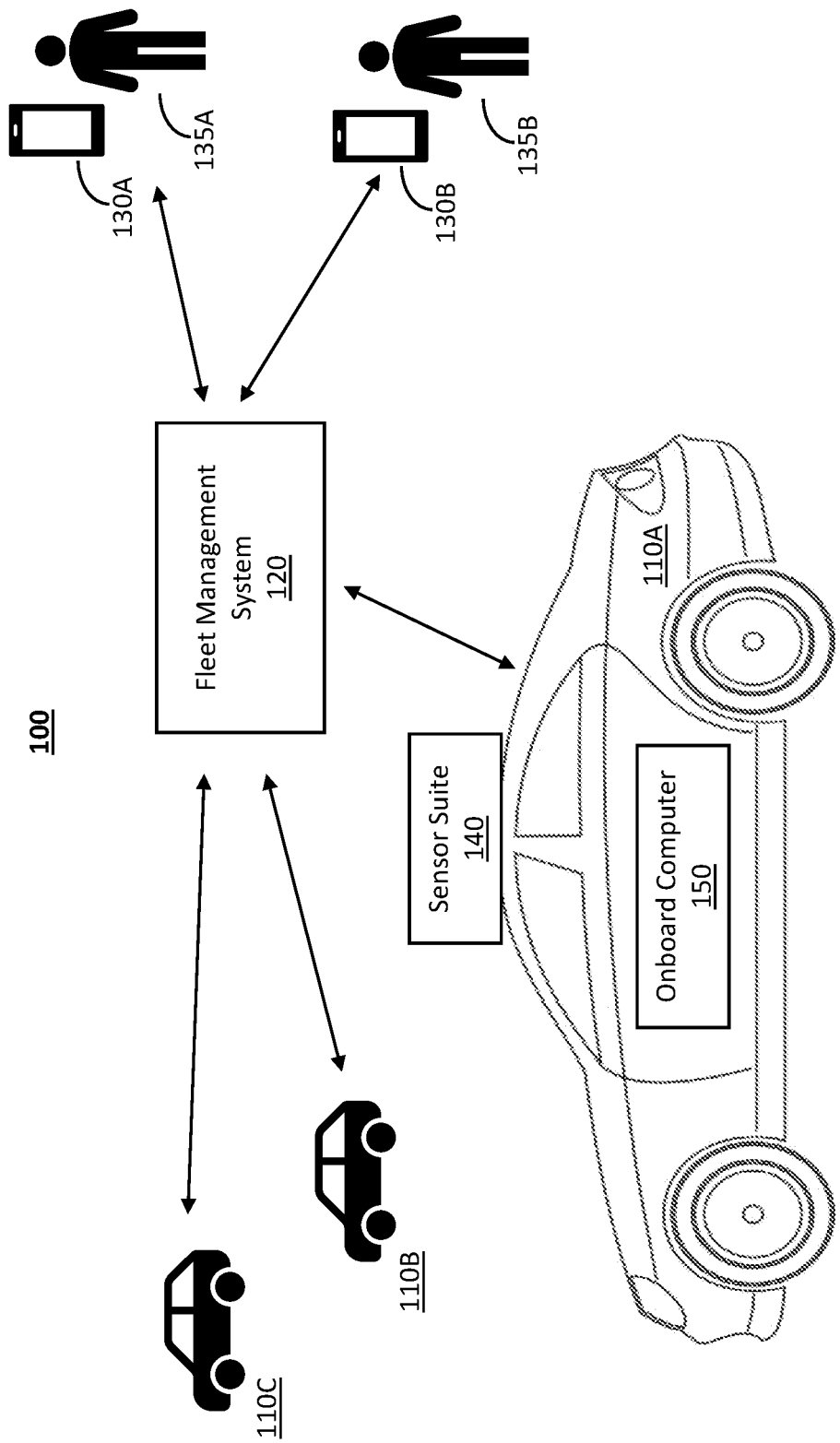
FIG. 1 illustrates a system including a fleet of AVs, according to some embodiments of the present disclosure.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

As described herein, AV sensors can be cleaned by using electrostatic and piezoelectric effects. A conductive layer can be placed over a surface of a sensor. The surface may be a surface of an enclosure of the sensor, a surface of a window of the sensor, a surface of an optical element of the sensor, etc. The conductive layer can be charged, either positively or negatively. Given electrostatic effects, the charged conductive layer can repel contaminants having the same polarity away from the sensor, resulting in a cleaner surface of the sensor. The polarity of the conductive layer may be determined based on data from a contaminant detector that detects contaminants in the environment surrounding the sensor. The contaminant detector can also detect polarities of the contaminants or a net polarity of the contaminants. A charging module can charge the conductive layer based on the polarity of the contaminants. The conductive layer may be sequentially charged with different polarities. For instance, the conductive layer can be first positively charged then negatively charged, or first negatively charged then positively charge, so that contaminants of both polarities can be removed from the sensor. Such a cycle can be repeated multiple times till the sensor is sufficiently cleaned.

In addition or alternative to electrostatic effects, piezoelectric effects can be used to clean AV sensors. In an example, a piezoelectric layer is arranged between two conductive layers. The two conductive layers may be in parallel with each other. One conductive layer can be affixed on a surface of a sensor. The two conductive layers can be charged with opposite polarities so that an electric field is present between the two conductive layers. The electric field is applied to the piezoelectric layer between the two conductive layers, resulting in mechanical strain in the piezoelectric layer. The mechanical strain can cause vibration of the piezoelectric layer. The vibration can remove contaminants off from the surface of the sensor. The piezoelectric layer and conductive layer can be transparent to avoid impacting detection of the sensor. The piezoelectric layer may have an opening that is over an opening or a component of the sensor through which light passes to enter the sensor, so that the light would not be distorted by the piezoelectric layer. In an example, the opening of the sensor may be an aperture. In another example, the component of the sensor may be a filter, a waveguide, a window, a cover, and so on. The conductive layer that is not affixed to the sensor directly can be charged with a polarity of contaminants in the environment of the sensor, and the electrostatic effects can also remove contaminants off from the surface of the sensor. The piezoelectric layer can be heated in some embodiments. The heat can enhance the piezoelectric effects, electrostatic effects, or both.

In some embodiments, a surface of a sensor may be divided into zones. Each zone may be associated with a cleaning pad that can remove contaminants from the zone. The cleaning pad may include one or more conductive layers and may also include a piezoelectric layer. The cleaning pads of the zones can be insulated from each other so that they can be separate charged. For instance, the cleaning pads can be sequentially charged. The sequence of the charging can be determined based on the locations of the cleaning pad. When a cleaning pad is charged, contaminants in that zone can be shifted to adjacent zones. Then the cleaning pads of the adjacent zones can be charged to further shift the contaminants. That way, contaminants on the sensor can be shuffled in a certain direction and be eventually removed from the surface of the sensor. By using multiple cleaning pads, the electrical and mechanical energy can be focused on a smaller area. Such a configuration may improve cleaning effectiveness in situations where the surface is too big for a single cleaning pad or contaminants are too hard to remove.

As will be appreciated by one skilled in the art, aspects of the present disclosure, in particular aspects of AV sensor calibration, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, or features are described below in connection with various example embodiments, these are merely examples used to simplify the present disclosure and are not intended to be limiting.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, or conditions, the phrase "between X and Y" represents a range that includes X and Y.

In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive or and not to an exclusive or.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

Example AV System

FIG. 1 illustrates a system 100 including a fleet of AVs that can provide 3D printing services, according to some embodiments of the present disclosure. The system 100 includes a fleet of AVs 110A-C (collectively referred to as "AV 110" or "AVs 110"), a fleet management system 120, and user devices 130A and 130B (collectively referred to as "user device 130" or "user devices 130"). For purpose of simplicity and illustration, in FIG. 1, the AV 110A includes a sensor suite 140 and an onboard computer 150. The AV 110B or 110C may also include a sensor suite 140 and an onboard computer 150. In other embodiments, the system 100 may include fewer, more, or different components. For instance, the system 100 may include a different number of AVs 110, a different number of user devices 130, etc.

The fleet management system 120 receives service requests for the AVs 110 from the user devices 130. As shown in FIG. 1, the user devices 130A and 130B are associated with users 135A and 135B, respectively. The users 135A and 135B are collectively referred to as "user 135" or "users 135." In other embodiments, a single user device 130 may be associated with multiple users 135. Also, a single user 135 may be associated with multiple user devices 130. A user device 130 may be one or more computing devices capable of receiving user input as well as transmitting and/or receiving data via one or more networks, e.g., a network through which the user device 130 can communicate with the fleet management system 120. In one embodiment, a user device 130 is a conventional computer system, such as a desktop or a laptop computer. Alternatively, a user device 130 may be a device having computer functionality, such as a personal digital assistant (PDA), a mobile telephone, a smartphone, or another suitable device.

In some embodiments, a user device 130 executes an application allowing a user 135 of the user device 130 to interact with the fleet management system 120. For example, a user device 130 executes a browser application to enable interaction between the user device 130 and the fleet management system 120 via a network. In another embodiment, a user device 130 interacts with the fleet management system 120 through an application programming interface (API) running on a native operating system of the user device 130, such as IOS® or ANDROID™. The application may be provided and maintained by the fleet management system 120. The fleet management system 120 may also update the application and provide the update to the user device 130.

In some embodiments, a user 135 may make various service requests to the fleet management system 120 through a user device 130. A user device 130 may provide its user 135 a user interface (UI), through which the user 135 can make service requests. For instance, a user 135 may make ride requests (e.g., a request to pick up a person from a pickup location and drop off the person at a destination location), delivery requests (e.g., a request to delivery one or more items from a location to another location), or requests for other services that the AVs 110 can provide. The UI may allow users 135 to provide locations (e.g., pickup location, destination location, etc.) or other information that would be needed by AVs 110 to provide services requested by the users 135.

The AV 110 may be a fully autonomous automobile, but may additionally or alternatively be any semi-autonomous or fully autonomous vehicle; e.g., a boat, an unmanned aerial vehicle, a driverless car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle. In some embodiments, some or all of the vehicle fleet managed by the fleet management system 120 are non-autonomous vehicles dispatched by the fleet management system 120, and the vehicles are driven by human drivers according to instructions provided by the fleet management system 120.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

As shown in FIG. 1, the AV 110 includes a sensor suite 140 and an onboard computer 150. The sensor suite 140 includes one or more sensors that can detect one or more features associated with the AV 110. Example features include features in an environment around the AV 110, features on the exterior of the AV 110, features inside the AV 110, and so on. The sensor suite 140 may include a computer vision ("CV") system, localization sensors, and driving sensors. For example, the sensor suite 140 may include interior and exterior cameras, RADAR sensors, sonar sensors, LIDAR sensors, thermal sensors, wheel speed sensors, inertial measurement units (IMUS), accelerometers, microphones, strain gauges, pressure monitors, barometers, thermometers, altimeters, ambient light sensors, and so on. The sensors may be located in various positions in and around the AV 110. For example, the AV 110 may have multiple cameras located at different positions around the exterior and/or interior of the AV 110. Certain aspects of the sensor suite 140 are described below in conjunction with FIG. 2.

The onboard computer 150 is connected to the sensor suite 140 and functions to control the AV 110 and to process sensed data from the sensor suite 140 and/or other sensors in order to determine the state of the AV 110. Based upon the vehicle state and programmed instructions, the onboard computer 150 modifies or controls behavior of the AV 110. The onboard computer 150 is preferably a general-purpose computer adapted for I/O communication with vehicle control systems and sensor suite 140, but may additionally or alternatively be any suitable computing device. The onboard computer 150 is preferably connected to the Internet via a wireless connection (e.g., via a cellular data connection). Additionally or alternatively, the onboard computer 150 may be coupled to any number of wireless or wired communication systems.

The onboard computer 150 can also maintain the sensor suite 140. In some embodiments, the onboard computer 150 monitors conditions of sensors in the sensor suite 140. For instance, the onboard computer 150 can maintain cleanness of sensors. The onboard computer 150 may determine whether a sensor needs cleaning and in response to determining that the sensor needs cleaning, the onboard computer 150 can control a sensor cleaning assembly to clean the sensor. Examples of the sensor cleaning assembly include the sensor cleaning assembly 400 in FIGS. 4A and 4B, the sensor cleaning assembly 500 in FIG. 5, the sensor cleaning assembly 600 in FIG. 6, the sensor cleaning assembly 700 in FIG. 7, and the sensor cleaning assembly 800 in FIG. 8.

In some embodiments, the onboard computer 150 may determine that a sensor needs cleaning based on detection of contamination (e.g., dust, dirt, fingerprints, moisture, etc.) of the sensor, e.g., by using sensor data captured by the sensor itself, sensor data captured by one or more other sensors, or some combination thereof. In alternative embodiments, the onboard computer 150 may request sensor cleaning on a regular basis. For instance, the onboard computer 150 may determine a schedule of cleaning a sensor and request sensor cleaning based on the schedule. Certain aspects regarding the onboard computer 150 are described below in conjunction with FIG. 3.

The fleet management system 120 manages the fleet of AVs 110. The fleet management system 120 may manage one or more services that provides or uses the AVs, e.g., 3D printing service, ride service, delivery service, and so on. The fleet management system 120 selects one or more AVs (e.g., AV 110A) from a fleet of AVs 110 to perform a particular service or other task, and instructs the selected AV to provide the service. The fleet management system 120 may also send the selected AV information that the selected AV may use to complete the service. The fleet management system 120 also manages fleet maintenance tasks, such as fueling, inspecting, calibrating, and servicing of the AVs. As shown in FIG. 1, the AVs 110 communicate with the fleet management system 120. The AVs 110 and fleet management system 120 may connect over a public network, such as the Internet. Certain aspects regarding the fleet management system 120 are described below in conjunction with FIG. 9.

Example Sensor Suite

Figure 2:
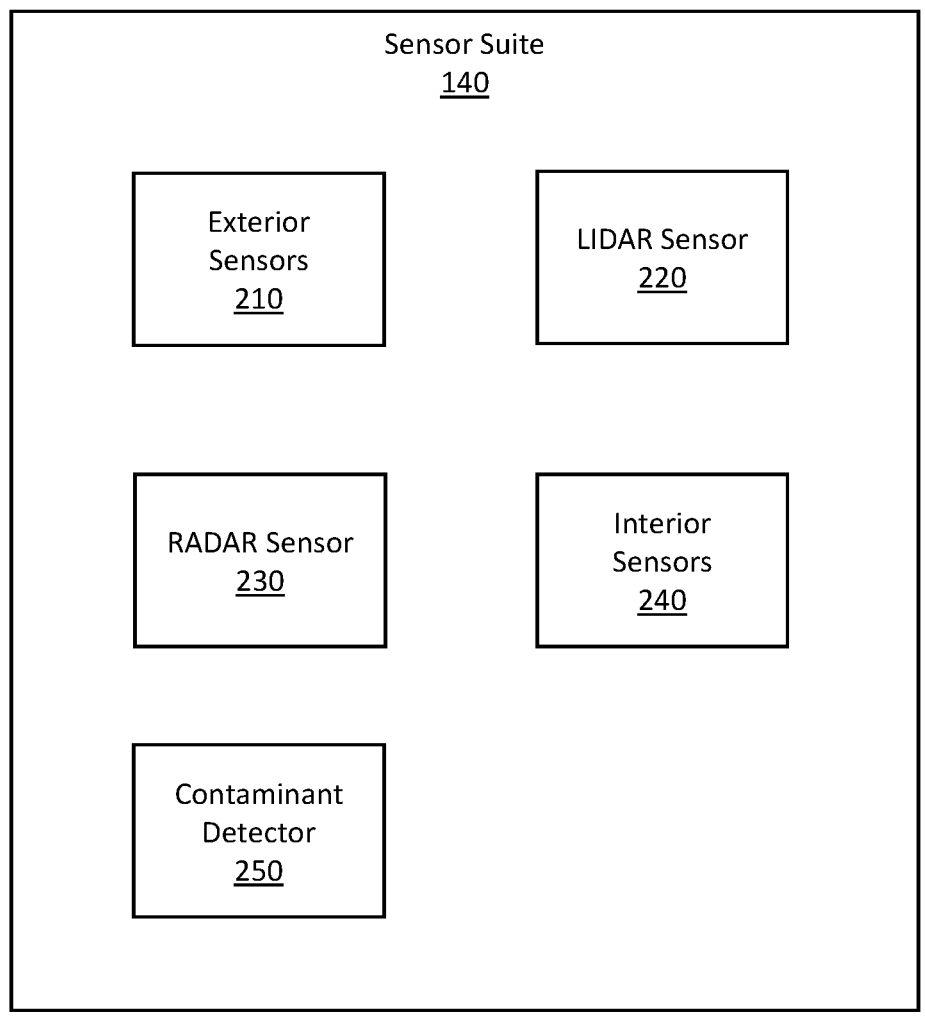
FIG. 2 is a block diagram showing a sensor suite, according to some embodiments of the present disclosure.

FIG. 2 is a block diagram showing the sensor suite 140, according to some embodiments of the present disclosure. The sensor suite 140 includes exterior sensors 210, a LIDAR sensor 220, a RADAR sensor 230, interior sensors 240, and a contaminant detector 250. The sensor suite 140 may include any number of the types of sensors shown in FIG. 2, e.g., one or more LIDAR sensor 220, one or more LIDAR sensors 220, or one or more contamination detectors 250. The sensor suite 140 may have more types of sensors than those shown in FIG. 2, such as the sensors described with respect to FIG. 1. In other embodiments, the sensor suite 140 may not include one or more of the sensors shown in FIG. 2.

The exterior sensors 210 detect objects in an environment around the AV 110. The environment may include a scene in which the AV 110 operates. Example objects include persons, buildings, traffic lights, traffic signs, vehicles, street signs, trees, plants, animals, or other types of objects that may be present in the environment around the AV 110. In some embodiments, the exterior sensors 210 include exterior cameras having different views, e.g., a front-facing camera, a back-facing camera, and side-facing cameras. One or more exterior sensors 210 may be implemented using a high-resolution imager with a fixed mounting and field of view. One or more exterior sensors 210 may have adjustable field of views and/or adjustable zooms. In some embodiments, the exterior sensors 210 may operate continually during operation of the AV 110. In an example embodiment, the exterior sensors 210 capture sensor data (e.g., images, etc.) of a scene in which the AV 110 drives. In other embodiment, the exterior sensors 210 may operate in accordance with an instruction from the onboard computer 150 or an external system, such as the fleet management system 120. Some of all of the exterior sensors 210 may capture sensor data of one or more objects in an environment surrounding the AV 110 based on the instruction.

The LIDAR sensor 220 measures distances to objects in the vicinity of the AV 110 using reflected laser light. The LIDAR sensor 220 may be a scanning LIDAR that provides a point cloud of the region scanned. The LIDAR sensor 220 may have a fixed field of view or a dynamically configurable field of view. The LIDAR sensor 220 may produce a point cloud that describes, among other things, distances to various objects in the environment of the AV 110.

The RADAR sensor 230 can measure ranges and speeds of objects in the vicinity of the AV 110 using reflected radio waves. The RADAR sensor 230 may be implemented using a scanning RADAR with a fixed field of view or a dynamically configurable field of view. The RADAR sensor 230 may include one or more articulating RADAR sensors, long-range RADAR sensors, short-range RADAR sensors, or some combination thereof.

The interior sensors 240 detect the interior of the AV 110, such as objects inside the AV 110. Example objects inside the AV 110 include passengers, client devices of passengers, components of the AV 110, items delivered by the AV 110, items facilitating services provided by the AV 110, and so on. The interior sensors 240 may include multiple interior cameras to capture different views, e.g., to capture views of an interior feature, or portions of an interior feature. The interior sensors 240 may be implemented with a fixed mounting and fixed field of view, or the interior sensors 240 may have adjustable field of views and/or adjustable zooms, e.g., to focus on one or more interior features of the AV 110. The interior sensors 240 may transmit sensor data to a perception module (such as the perception module 330 described below in conjunction with FIG. 5), which can use the sensor data to classify a feature and/or to determine a status of a feature.

In some embodiments, some or all of the interior sensors 240 may operate continually during operation of the AV 110. In other embodiment, some or all of the interior sensors 240 may operate in accordance with an instruction from the onboard computer 150 or an external system. The interior sensors 240 may include a camera that can capture images of passengers. The interior sensors 240 may also include one or more microphones that can capture sound in the AV 110, such as a conversation made by a passenger.

The contaminant detector 250 detects contamination of one or more other sensors in the sensor suite 140, such as one or more exterior sensors 210, one or more LIDAR sensors 220, one or more RADAR sensors 230, one or more interior sensors 240, or some combination thereof. The contaminant detector 250 may detect contaminants accumulated on a sensor, such as on a portion, a surface, or a component of a sensor. Additionally or alternatively, the contaminant detector 250 may detect contaminants in an environment surrounding a sensor. For instance, the contaminant detector 250 can detect objects in the environment that can contaminate the sensor and undermine performance of the sensor. Such objects may also be referred to as contaminants. Example contaminants include dirt, dust, dirt, moisture, or other objects that can contaminate the sensor and undermine performance of the sensor. The contaminant detector 250 may capture sensor data indicating a contaminant level of the environment.

In some embodiments, the contaminant detector 250 includes an electrical polarity detector (also referred to as "polarity detector"). The polarity detector may be an electrostatic polarity detector. The polarity detector can detect electrical polarities of contaminants. For instance, the polarity detector can detect if a contaminant is negatively or positively charged. The contaminant detector 250 may be associated with one or more other sensors of the sensor suite 140 and detect contaminations for the one or more other sensors. The contaminant detector 250 may be affixed on the one or more other sensors or be physically separately from the one or more other sensors. In some embodiments, the contaminant detector 250 is one of the exterior sensors 210 or one of the interior sensors 240.

Example Onboard Computer

Figure 3:
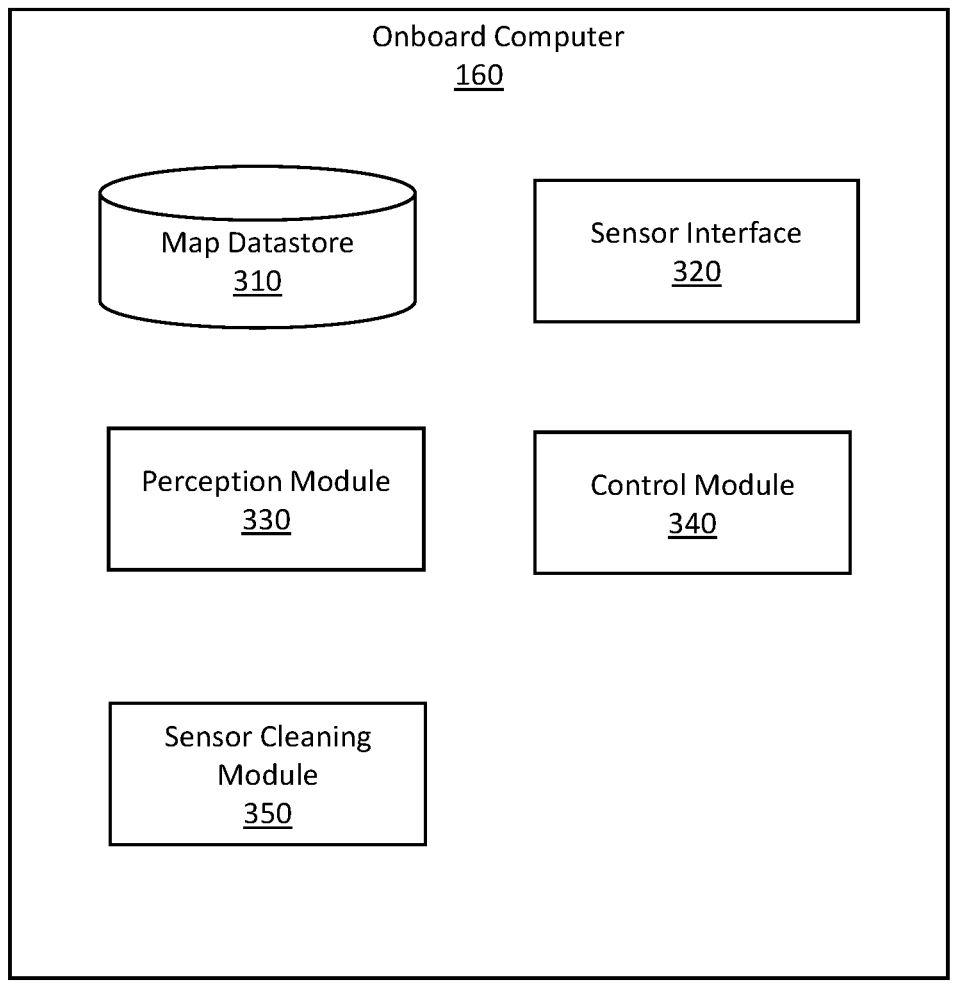
FIG. 3 is a block diagram showing an onboard computer, according to some embodiments of the present disclosure.

FIG. 3 is a block diagram showing the onboard computer 150, according to some embodiments of the present disclosure. The onboard computer 150 includes map datastore 310, a sensor interface 320, a perception module 330, a control module 340, and a sensor cleaning module 350. In alternative configurations, fewer, different and/or additional components may be included in the onboard computer 150. For example, components and modules for conducting route planning, controlling movements of the AV 110, and other vehicle functions are not shown in FIG. 3. Further, functionality attributed to one component of the onboard computer 150 may be accomplished by a different component included in the onboard computer 150 or a different system from those illustrated, such as a sensor cleaning assembly or the fleet management system 120.

The map datastore 310 stores a detailed map of environments through which the AV 110 may travel. The map datastore 310 may store environmental features captured by exterior sensors (e.g., the exterior sensor 210) of the AV 110. In some embodiments, the map datastore 310 may also store environmental features captured by other AVs. In some embodiments, the map datastore 310 includes data describing roadways, such as locations of roadways, connections between roadways, roadway names, speed limits, traffic flow regulations, toll information, etc. The map datastore 310 may further include data describing buildings (e.g., locations of buildings, building geometry, building types), and data describing other objects (e.g., location, geometry, object type) that may be in the environments of an AV. The map datastore 310 may also include data describing other features, such as bike lanes, sidewalks, crosswalks, traffic lights, parking lots, signs, billboards, etc. In some embodiments, the map datastore 310 stores map data for a city or region in which the AV 110 is located.

Some of the map datastore 310 may be gathered by the AV 110. For example, images obtained by exterior sensors (e.g., the exterior sensor 210) of the AV 110 may be used to learn information about the AV' environments. The output of the exterior sensors may be processed to identify particular conditions in the environment, such as road conditions, weather conditions, etc. In some embodiments, certain map data (e.g., conditions that are expected to be temporary) may expire after a certain period of time. In some embodiments, data captured later by the AV 110 or a different AV may indicate that a previously-observed feature is no longer present (e.g., weather has been changed, construction work zone has been removed, etc.) and in response, the map data may be removed from the map datastore 310.

The sensor interface 320 interfaces with the sensors in the sensor suite 140. The sensor interface 320 is configured to receive data captured by sensors of the sensor suite 140, including data from exterior sensors mounted to the outside of the AV 110, and data from interior sensors mounted in the passenger compartment of the AV 110. The sensor interface 320 may have subcomponents for interfacing with individual sensors or groups of sensors of the sensor suite 140, such as a camera interface, a LIDAR interface, a RADAR interface, a microphone interface, etc.

The sensor interface 320 may also request data from the sensor suite 140, e.g., by requesting that a sensor capture data in a particular direction or at a particular time. For example, the sensor interface 320 may request an interior sensor (e.g., the interior sensor 240) to detect one or more features in the AV 110 periodically to monitor status of the features and to facilitate timely replacement of a feature if the feature malfunctions. As another example, in response to the perception module 330 or another module determining that a feature in the AV 110 malfunctions, the sensor interface 320 instructs the interior sensor to capture additional data (e.g., dimensions, shape, etc.) of the feature, e.g., by zooming in and focusing on the feature.

The perception module 330 identifies objects and/or other features captured by the sensors of the AV 110. For example, the perception module 330 identifies objects in the environment of the AV 110 and captured by one or more exterior sensors (e.g., the sensors 210-230). The perception module 330 may include one or more classifiers trained using machine learning to identify particular objects. For example, a multi-class classifier may be used to classify each object in the environment of the AV 110 as one of a set of potential objects, e.g., a vehicle, a pedestrian, or a cyclist. As another example, a pedestrian classifier recognizes pedestrians in the environment of the AV 110, a vehicle classifier recognizes vehicles in the environment of the AV 110, etc. The perception module 330 may identify travel speeds of identified objects based on data from the RADAR sensor 230, e.g., speeds at which other vehicles, pedestrians, or birds are traveling. As another example, the perception module 33—may identify distances to identified objects based on data (e.g., a captured point cloud) from the LIDAR sensor 220, e.g., a distance to a particular vehicle, building, or other feature identified by the perception module 330. The perception module 330 may also identify other features or characteristics of objects in the environment of the AV 110 based on image data or other sensor data, e.g., colors (e.g., the colors of Christmas lights), sizes (e.g., heights of people or buildings in the environment), makes and models of vehicles, pictures and/or words on billboards, etc.

The perception module 330 may further process data from captured by interior sensors (e.g., the interior sensors 240 of FIG. 2) to determine information about and/or behaviors of passengers in the AV 110. For example, the perception module 330 may perform facial recognition based on sensor data from the interior sensors 240 to determine which user is seated in which position in the AV 110. As another example, the perception module 330 may process the sensor data to determine passengers' states, such as gestures, activities (e.g., whether passengers are engaged in conversation), moods (whether passengers are bored (e.g., having a blank stare, or looking at their phones)), and so on. The perception module may analyze data from the interior sensors 240, e.g., to determine whether passengers are talking, what passengers are talking about, the mood of the conversation (e.g., cheerful, annoyed, etc.). In some embodiments, the perception module 330 may determine individualized moods, attitudes, or behaviors for the users, e.g., if one user is dominating the conversation while another user is relatively quiet or bored; if one user is cheerful while the other user is getting annoyed; etc. In some embodiments, the perception module 330 may perform voice recognition, e.g., to determine a response to a game prompt spoken by a user.

In some embodiments, the perception module 330 fuses data from one or more interior sensors 240 with data from exterior sensors (e.g., exterior sensors 210) and/or map datastore 310 to identify environmental objects that one or more users are looking at. The perception module 330 determines, based on an image of a user, a direction in which the user is looking, e.g., a vector extending from the user and out of the AV 110 in a particular direction. The perception module 330 compares this vector to data describing features in the environment of the AV 110, including the features' relative location to the AV 110 (e.g., based on real-time data from exterior sensors and/or the AV's real-time location) to identify a feature in the environment that the user is looking at.

While a single perception module 330 is shown in FIG. 3, in some embodiments, the onboard computer 150 may have multiple perception modules, e.g., different perception modules for performing different ones of the perception tasks described above (e.g., object perception, speed perception, distance perception, feature perception, facial recognition, mood determination, sound analysis, gaze determination, etc.).

The control module 340 controls operations of the AV 110, e.g., based on information from the sensor interface 320 or the perception module 330. In some embodiments, the control module 340 controls operation of the AV 110 by using a trained model, such as a trained neural network. The control module 340 may provide input data to the control model, and the control model outputs operation parameters for the AV 110. The input data may include sensor data from the sensor interface 320 (which may indicate a current state of the AV 110), objects identified by the perception module 330, or both. The operation parameters are parameters indicating operation to be performed by the AV 110. The operation of the AV 110 may include perception, prediction, planning, localization, motion, navigation, other types of operation, or some combination thereof. The control module 340 may provide instructions to various components of the AV 110 based on the output of the control model, and these components of the AV 110 will operation in accordance with the instructions. In an example where the output of the control model indicates that a change of traveling speed of the AV 110 is required given a prediction of traffic condition, the control module 340 may instruct the motor of the AV 110 to change the traveling speed of the AV 110. In another example where the output of the control model indicates a need to detect characteristics of an object in the environment around the AV 110 (e.g., detect a speed limit), the control module 340 may instruct the sensor suite 140 to capture an image of the speed limit sign with sufficient resolution to read the speed limit and instruct the perception module 330 to identify the speed limit in the image.

The sensor cleaning module 350 manages cleaning of one or more sensor in the sensor suite 140. In some embodiments, the sensor cleaning module 350 may manage the cleaning of a category of sensors, e.g., optical sensors or other types of sensors. The sensor cleaning module 350 may control operation of one or more sensor cleaning assemblies for cleaning sensors. Example sensor cleaning assemblies including sensor cleaning assemblies 400, 500, 600, 700, and 800 described below in conjunctions with FIGS. 4A-4B and 5-8. In some embodiments, some or all functions of the sensor cleaning module 350 may be performed by one or more components of the sensor cleaning assemblies.

The sensor cleaning module 350 may determine whether a sensor (e.g., a surface of a sensor) needs cleaning. In some embodiments, the sensor cleaning module 350 uses sensor data to determine whether a sensor needs cleaning. The sensor data may be from the sensor itself or another sensor, e.g., the contaminant detector 250 in FIG. 2. The sensor cleaning module 350 may request the sensor data, e.g., through the sensor interface 320.

The sensor cleaning module 350 may determine a contamination condition of the sensor based on the sensor data. In an example, the sensor cleaning module 350 may identify, from the sensor data, contaminants accumulated on the sensor. The identification of the contaminants may alternatively be done by the perception module 330, which can provide information of the identification to the sensor cleaning module 350. The sensor cleaning module 350 may determine whether the contamination condition of the sensor meets a threshold condition, e.g., a threshold number of contaminants, a threshold concentration of contaminants (e.g., number per unit area or unit volume), and so on. In response to determining that the contamination condition of the sensor meets the threshold condition, the sensor cleaning module 350 determines that the sensor needs cleaning. In another example, the sensor cleaning module 350 may determine a performance of the sensor based on the sensor data. The performance may be an accuracy, brightness, signal-to-noise ratio, or other attributes of the sensor data. The sensor cleaning module 350 can compare the performance of the sensor with a corresponding predetermined performance (e.g., required performance, expected performance, etc.) of the sensor and in response to determining that the performance of the sensor does not meet the predetermined performance, the sensor cleaning module 350 determines that the sensor needs cleaning.

In addition or alternative to sensor data, the sensor cleaning module 350 may use other data to determine whether a sensor needs clean. For instance, the sensor cleaning module 350 may determine a frequency of cleaning a sensor. The frequency indicates how often the sensor needs cleaning. The sensor cleaning module 350 may determine the frequency based on one or more attributes of the sensor (e.g., pose (position, orientation, or both) of the sensor, material of the sensor, sensitivity to contaminants, etc.), one or more attributes of the environment surrounding the sensor (e.g., cleanness of the environment, weather of the environment, etc.) The sensor cleaning module 350 can maintain a record of historical cleanings of the sensor and/or determine a time for the next cleaning. The sensor cleaning module 350 can determine that the sensor needs cleaning when the determined time is reached.

In some embodiments (e.g., embodiments where sensors can be cleaned by charging conductive layers to remove contaminants from the sensors), the sensor cleaning module 350 may also control charging of conductive layers associated with sensors. Example conductive layers include conductive layers 410, 513, 517, 613, 617, 713, 717, 813, and 817 shown in FIGS. 4A-4B and 5-8. In some embodiments, the sensor cleaning module 350 determines an electrical voltage of a conductive layer. The voltage may be a voltage between the conductive layer and the ground, or a voltage between the conductive layer and another conductive layer. The voltage may be a direct current (DC) voltage. The sensor cleaning module 350 may determine the voltage based on a contamination level of the sensor, which indicates the level of contamination of the sensor. For instance, the sensor cleaning module 350 determines a higher voltage in embodiments where the contamination level of the sensor is higher but determines a lower voltage in embodiments where the contamination level of the sensor is lower.

The sensor cleaning module 350 may also determine a polarity for charging a conductive layer. A conductive layer may be charged positively or negatively. The sensor cleaning module 350 can determine the polarity of charging the conductive layer based on a polarity of contaminants in the environment surrounding the sensor. The sensor cleaning module 350 may determine that the polarity of charging the conductive layer is the same as the polarity of contaminants. The polarity of contaminants may be determined based on sensor data from a contaminant detector. In some embodiments, the sensor cleaning module 350 may determine to charge a conductive layer with both polarities. For instance, the conductive layer can be charged in a cycle that includes positive charging and negative charging at different times. The sensor cleaning module 350 can determine a voltage and time of duration for each charging in the cycle. The sensor cleaning module 350 may also determine how many cycles is needed to clean the sensor.

The sensor cleaning module 350 may control sequential repelling of contaminants at different portions of a sensor to shuffle the contaminants in certain direction. In some embodiments (e.g., embodiments where a sensor has multiple conductive layers associated with different portions of the sensor), the sensor cleaning module 350 may determine an order of charging the conductive layers. The sensor cleaning module 350 may analyze the arrangement of the conductive layers on the sensor. The arrangement of the conductive layers may be a one-dimensional array (e.g., the conductive layers arranged in a column or a row) or a two-dimensional array (e.g., the conductive layers arranged in rows and columns). In an embodiment, the sensor cleaning module 350 may select a conductive layer in the middle of the array as first conductive layer to be charged. The sensor cleaning module 350 may select one or more other conductive layers that are adjacent to the first conductive layer as second conductive layer(s) to be charged. A conductive layer that is further from the first conductive layer in the array is charged later. The more other conductive layers that are furthest from the first conductive layer can be charged last. In another embodiment, the order of charging the conductive layers may match the order in which the conductive layers are arranged.

The sensor cleaning module 350 may control a heating module (e.g., the heating module 670 in FIG. 6) that can heat a conductive layer. The sensor cleaning module 350 may determine whether to trigger an operation of the hearing module based on a detection of a condition (e.g., temperature, humidity level, etc.) in the environment surrounding the sensor. In an example, the sensor cleaning module 350 determines to trigger an operation of the heating module 670 based on a determination that a temperature of the environment is below a threshold temperature or that a humidity level of the environment is above a threshold humidity level. The sensor cleaning module 350 may also determine a target temperature of the conductive layer and instruct the heating module 670 to increase the temperature of the conductive layer of the target temperature. In embodiments where the heating module 670 heats the conductive layer through an electrical signal (e.g., electrical current), the sensor cleaning module 350 may determine parameters of the electrical signal, e.g., magnitude, time of duration, frequency, and so on.

The sensor cleaning module 350 may also determine whether a sensor is sufficiently cleaned after a cleaning cycle, e.g., based on sensor data from the sensor itself or the contaminant detector 250. The sensor cleaning module 350 may determine whether the amount of contaminants accumulated on the sensor meets a threshold, or determine whether a performance of the sensor meets a threshold. In response to determining that sensor is sufficiently cleaned, the sensor cleaning module 350 may provide a notification to the sensor interface 320 and the sensor interface 320 can instruct the sensor to capture data to be used by the perception module 330 or control module 340 to control operation of the AV 110. In response to determining that sensor is not sufficiently cleaned, the sensor cleaning module 350 may repeat the cleaning cycle until the sensor is sufficiently cleaned.

Example Sensor Cleaning Assemblies

Figure 4A:
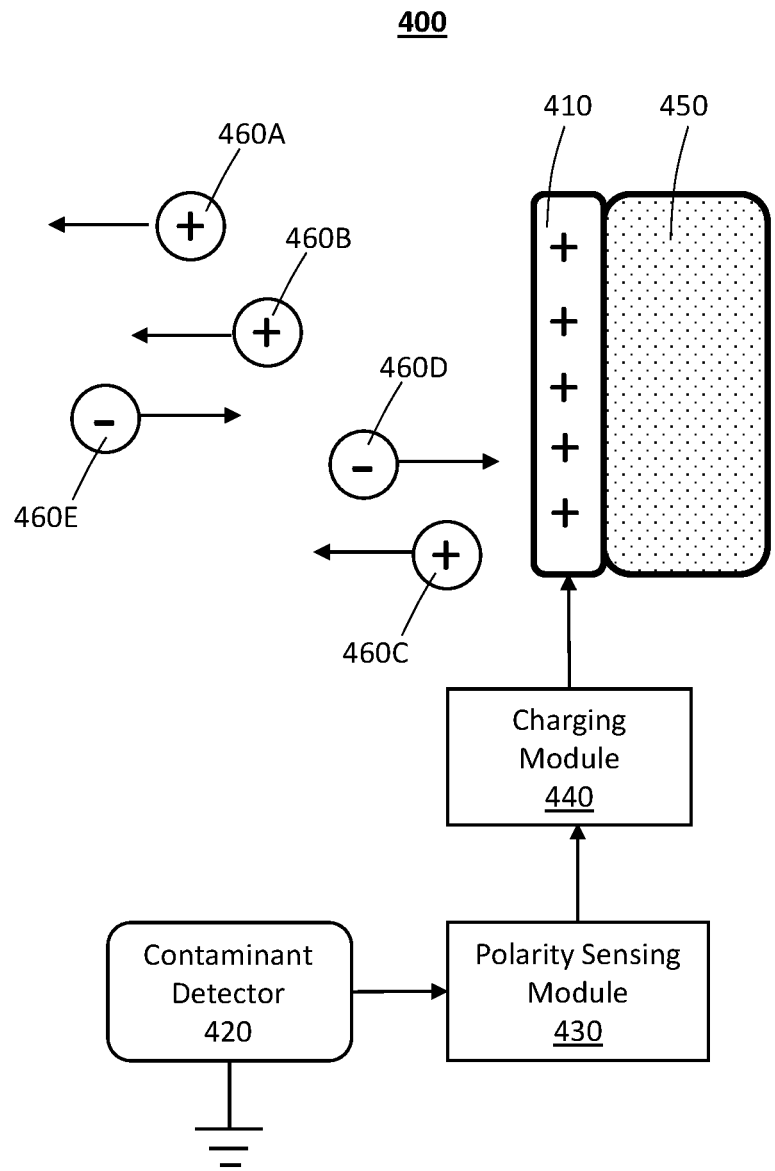
FIGS. 4A and 4B illustrate an example sensor cleaning assembly including a conductive layer, according to some embodiments of the present disclosure.
Figure 4B:
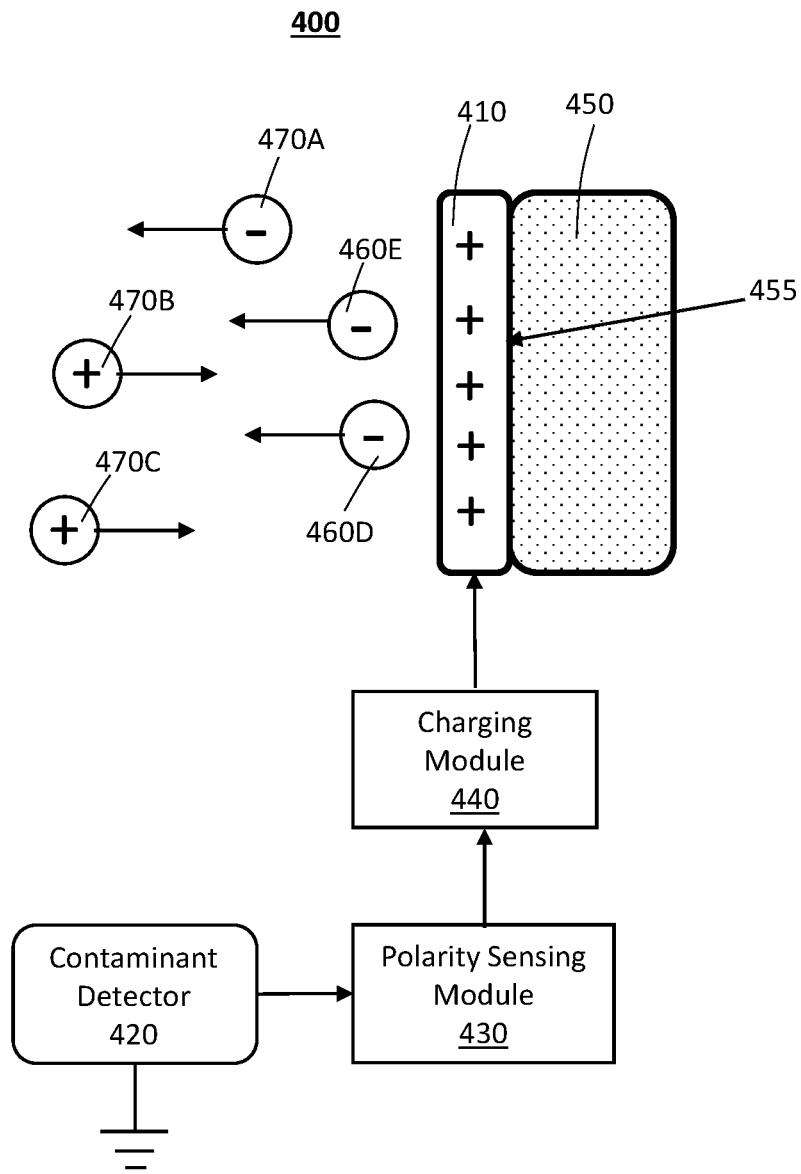

FIGS. 4A and 4B illustrates an example sensor cleaning assembly 400 including a conductive layer 410, according to some embodiments of the present disclosure. The sensor cleaning assembly 400 also includes a contaminant detector 420, a polarity sensing module 430, and a charging module 440. In other embodiments, the sensor cleaning assembly 400 may include different, fewer, or more components. Also, functionality attributed to a component of the sensor cleaning assembly 400 may be accomplished by a different component included in the sensor cleaning assembly 400 or a different system than those illustrated, such as the onboard computer 150. For example, some or all functions of the polarity sensing module 430 may be performed by a sensor cleaning module, e.g., the sensor cleaning module 350, in the onboard computer 150.

The conductive layer 410 is arranged over a sensor 450, particularly over a surface 455 of the sensor 450. The conductive layer 410 may be a coating that includes a conductive material. The sensor 450 may be an optical sensor, such as a LIDAR sensor, an exterior camera, or an interior camera. The sensor 450 may receive light through the surface 455. In an example where the sensor 450 is a camera, the surface 455 may include an aperture of the camera. Cleanliness of the surface 455 can influence the performance of the sensor 450. The conductive layer 410 may be transparent so that light can pass through the conductive layer 410 and reach the surface 455. The conductive layer 410 may be affixed on the surface 455 through an adhesive agent. The adhesive agent may also be transparent. Also, the material or configuration of the conductive layer 410 or adhesive agent may be selected to minimize optical distortion caused by the conductive layer 410 or adhesive agent.

The conductive layer 410 can be charged, e.g., with negative charges or positive charges. The charges in the conductive layer 410 can drive contaminants away from the surface 455. As shown in FIG. 4A, the conductive layer 410 is charged with positive charges, indicated by the "+" symbols in the conductive layer 410. The positive charges are driving away contaminants 460A-460B, which also have positive charges. The charging of the conductive layer 410 may be triggered by sensor data generated by the sensor 450 or the contaminant detector 420, e.g., sensor data that detects the contaminants 460A-460B.

The contaminant detector 420 may detect contaminants in an environment surrounding the sensor 450. The contaminants include contaminants 460A-460E (collectively referred to as "contaminants 460" or "contaminant 460") shown in FIG. 4A. For purpose of simplicity and illustration, FIG. 4A shows the five contaminants 460A-460E. In other embodiments, the contaminant detector 420 can detect different, more, or fewer contaminants. The contaminants 460A-460E may be mobile particles that can accumulate on the surface 455 of the sensor 450 and contaminate the surface 455. The contaminant detector 420 can detect electrical polarities of the contaminants 460A-460E. The contaminant detector 420 may be an embodiment of the contaminant detector 250 in FIG. 2. The contaminant detector 420 may be grounded.

In some embodiments, the contaminant detector 420 may be controlled the onboard computer 150, e.g., through the sensor interface 320 of the onboard computer 150. For instance, the onboard computer 150 may send a request for sensor data to the contaminant detector 420 and the contaminant detector 420, in response to receiving the request, detects contaminants or polarity of contaminants in the environment. The contaminant detector 420 may provide sensor data capturing the contaminants 460A-460E to the onboard computer 150 for the onboard computer 150 to determine whether the surface 455 needs cleaning. The contaminant detector 420 may also providing sensor data capturing polarity of the contaminants 460A-460E to the polarity sensing module 430.

The polarity sensing module 430 determines of a polarity of charges to be provided to the conductive layer 410 based on data from the contaminant detector 420. The polarity sensing module 430 may be a polarity sensing circuit. In some embodiments, the polarity sensing module 430 receives sensor data from the contaminant detector 420 as an input and outputs an electrical polarity. For instance, the polarity sensing module 430 determines a net polarity of the contaminants 460A-460E based on the data from the contaminant detector 420. In the embodiments of FIG. 4A, as three contaminants 460A-460C are positively polarized and two contaminants 460D and 460E are negatively polarized, the net polarity of the 460A-460E is positive. The polarity sensing module 430 can provide the determined polarity to the charging module 440 and instructs the charging module 440 to provide charges of the determined polarity to the conductive layer 410.

The charging module 440 charges the conductive layer 410, e.g., based on the electrical polarity determined by the polarity sensing module 430. The charging module 440 may be a charging circuit. The charging module 440 can provide charges of the same polarity to the conductive layer 410. In some embodiments, the charging module 440 may include or be coupled with a power supply, such as a battery, an electrical outlet, etc. The power supply can provide a supply voltage. The charging module 440 provides a connection from the power supply to the conductive layer 410 so that the conductive layer 410 can be charged. The charging module 440 can control the connection from the power supply to the conductive layer 410 to control polarity of the conductive layer 410. For instance, the conductive layer 410 can be positively charge if the conductive layer is coupled to the positive terminal of the power supply, versus the conductive layer 410 can be negatively charge if the conductive layer is coupled to the negative terminal of the power supply. In some embodiments, a voltage of the conductive layer 410, e.g., a voltage across the conductive layer 410 and the ground, may equal the supply voltage, e.g., a voltage between the positive terminal and negative terminal of the power supply. The voltage of the conductive layer 410 correlates to the number of charges accumulated in the conductive layer 410. The more charges accumulated in the conductive layer 410, the higher the voltage.

In alternative embodiments, the charging module 440 may include a charge pump. The charge pump can change (e.g., raise or lower) the supply voltage from the power supply and generate a load voltage. The charge pump may include a switching device that controls the connection from the power supply to the conductive layer 410 through one or more capacitors. In an embodiment, the capacitor may be initially coupled to the power supply and be charged to the supply voltage. After the capacitor is charged, the switching device can change the configuration of the circuit so that the capacitor is in series with the power supply and the conductive layer 410. That way the voltage of the conductive layer 410, e.g., a voltage across the conductive layer 410 and the ground, is two times of the supply voltage, i.e., the sum of the supply voltage and the capacitor voltage. In an alternative embodiment, the switching device may change the configuration of the circuit in a different way so that the voltage of the conductive layer 410 may be lower than the supply voltage. A ratio of the voltage of the conductive layer 410 to the supply voltage may be 1:3, 1:2, 1:1, 2:1, 3:1, or other ratios.

As shown in FIG. 4A, the conductive layer 410 is charged with positive charges. The positive charges in the conductive layer 410 can drive away contaminants having positive polarity, e.g., the contaminants 460A-460C, and remove the contaminants from the surface 455. However, the positive charges in the conductive layer 410 can also draw contaminants having negative polarity, e.g., the contaminants 460D and 460E, towards the surface 455, and may cause accumulation of such contaminants on the surface 455.

In order to remove contaminants having negative polarity from the surface 455, the charging module 440 can provide negative charges to the conductive layer 410 after it provides positive charges to the conductive layer 410. As shown in FIG. 4B, the conductive layer 410 is charged with negative charges, as indicated by the "−" symbols. The negative charges in the conductive layer 410 can drive away the contaminants 460D and 460E and a new contaminant 470A and remove these contaminants from the surface 455. The negative charges also attract contaminants 470B and 470C, which may accumulate on the surface 455. The charging module 440 can switch the charging of the conductive layer 410 back to positive charging to remove the contaminants 470B and 470C from the surface 455. In some embodiments, the charging module 440 can repeat the cycle of positive charging then negative charging multiple times to clean the surface 455.

In some embodiments, the charging module 440 can charge the conductive layer 410 in one or more charging cycles. Specifications of the charging cycles (e.g., polarities, time duration of each charging cycle, the number of charging cycles, etc.) may be determined by the sensor cleaning module 350 of the onboard computer 150 or the charging module 440. The number of charging cycles needed for cleaning the sensor 450 can be determined based on data indicating a density of contaminants in the environment (e.g., from the contaminant detector 420) or data indicating an amount of contaminants accumulated on the surface 455 (e.g., from the sensor 450). In alternative embodiments, the charging module 440 may repeat the cycle till a threshold condition is met. The threshold condition may be a threshold number of cycles, a threshold level of cleanliness of the surface 455, and so on. A charging cycle may occur, wholly or partially, during a movement of the AV 110, and the movement of the AV 110 can facilitate removal of contaminants. For instance, as the contaminants are repelled away from sensors, the contaminants can be blown away by the wind caused by the movement of the AV 110.

Even though not shown in FIG. 4, the sensor cleaning assembly 400 may include one or more additional coatings, such as anti-scratch coating, anti-reflective coating, or other types of coatings that can enhance reliability or optical performance of the sensor cleaning assembly 400 or the sensor 450. In some embodiments, an additional coating may be arranged between the conductive layer 410 and the sensor 450. In other embodiments, the conductive layer 410 may be between one or more additional coatings and the sensor 450.

Figure 5:
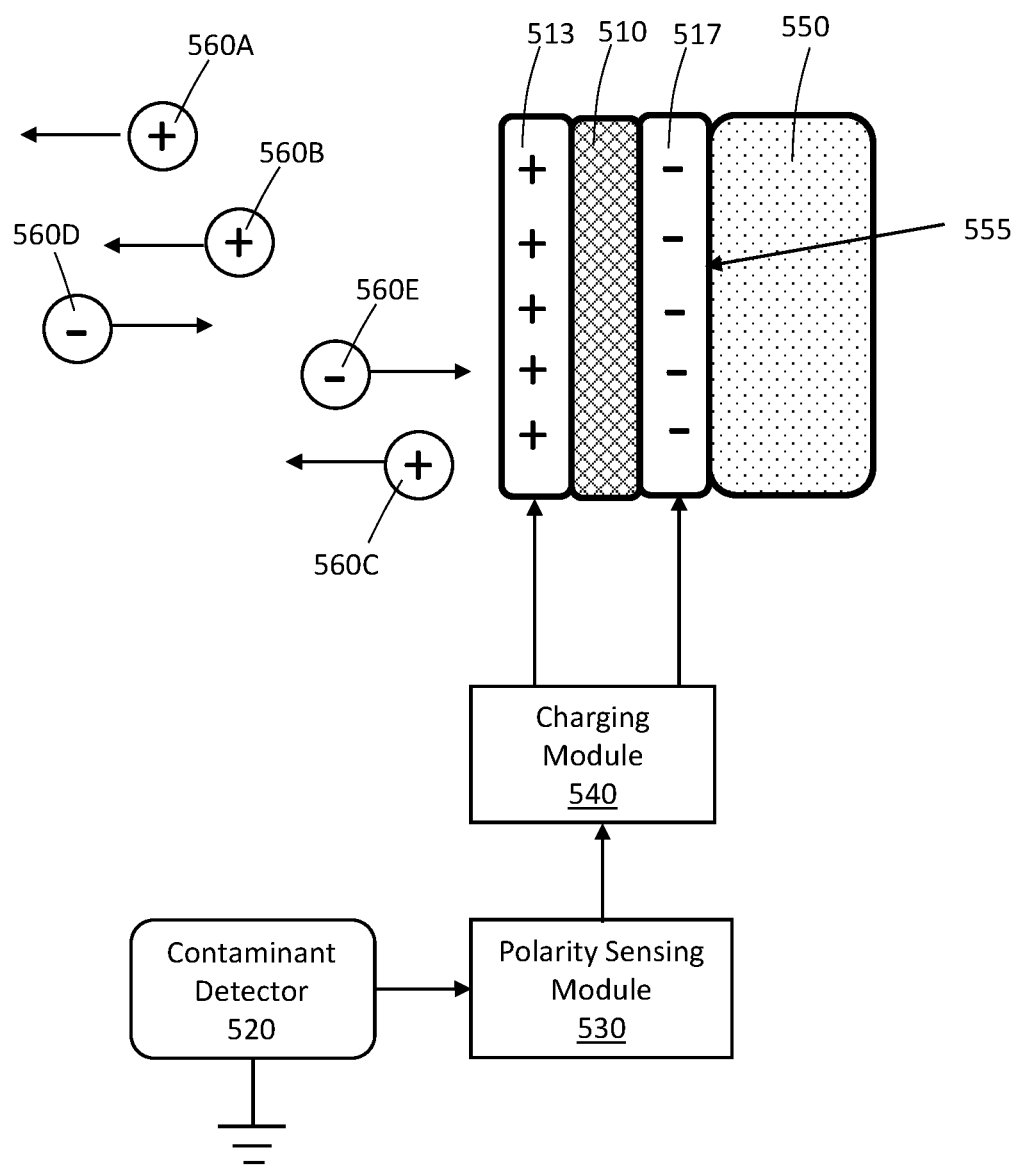
FIG. 5 illustrates an example sensor cleaning assembly including a piezoelectric layer, according to some embodiments of the present disclosure.

FIG. 5 illustrates an example sensor cleaning assembly 500 including a piezoelectric layer 510, according to some embodiments of the present disclosure. The sensor cleaning assembly 500 also includes conductive layers 513 and 517, a contaminant detector 520, a polarity sensing module 530, and a charging module 540. In other embodiments, the sensor cleaning assembly 500 may include different, fewer, or more components. Also, functionality attributed to a component of the sensor cleaning assembly 500 may be accomplished by a different component included in the sensor cleaning assembly 500 or a different system than those illustrated, such as the onboard computer 150. For example, some or all functions of the polarity sensing module 530 may be performed by a sensor cleaning module, e.g., the sensor cleaning module 350, in the onboard computer 150.

The piezoelectric layer 510 is between the two conductive layers 513 and 517. The piezoelectric layer 510 is affixed onto the conductive layers 513 and 517, e.g., through an adhesive agent. The conductive layer 517 is affixed on to a surface 555 of a sensor 550, e.g., through the same or a different adhesive agent. The conductive layer 513 is further from the surface 555 and faces the outside. The sensor 550 may be the same or similar as the sensor 450. The conductive layer 513 or 517 may be the same as or similar to the conductive layer 410 in FIG. 4. The piezoelectric layer 510, the conductive layers 513 and 517, and the adhesive agents (if any) may be transparent so that light can pass through them to reach the surface 555 of the sensor 550.

Similar to the conductive layer 410 in the sensor cleaning assembly 400, the conductive layer 513 in the sensor cleaning assembly 500 can be charged to drive contaminants away from the sensor 550. As shown in FIG. 5, the conductive layer 513 is positively charged and has a positive polarity. The conductive layer 513 drives away contaminants 460A-460C that also have positive polarity. The conductive layer 517 has an opposite polarity from the conductive layer 513. As shown in FIG. 5, the conductive layer 517 is negatively charged and has a negative polarity. An electric field is present between the conductive layers 513 and 517. The electric field can trigger a piezoelectric effect (e.g., a reverse piezoelectric effect) in the piezoelectric layer 510.

The piezoelectric layer 510 includes a piezoelectric material. The piezoelectric material may exhibit reverse piezoelectric effect, i.e., a mechanical strain can be generated inside the piezoelectric material when the piezoelectric material receives an electrical signal. Examples of the piezoelectric material include piezoceramics, such as niobate, ferrite, titanate, tungstate, and so on. Other examples of the piezoelectric material include polymers or semiconductors that exhibit piezoelectric effect or reverse piezoelectric effect. The electrical filed present between the conductive layers 513 and 517 is applied on the piezoelectric layer 510 and causes a mechanical strain in the piezoelectric layer 510. The mechanical strain can change the shape or size of the piezoelectric layer 510, resulting a vibration of the piezoelectric layer 510. The vibration can be transferred to the conductive layer 513 as the piezoelectric layer 510 is affixed on the conductive layer 513. The vibration can facilitate repelling contaminants from the conductive layer 513 and thereby enhance the effectiveness of the cleaning.

In some embodiments, the vibration can be beamformed to enhance and focus the mechanical energy to where it needs to be. The piezoelectric layer 510 may include a plurality of piezoelectric elements. The piezoelectric elements may be arranged in an array (e.g., columns and/or rows). The piezoelectric elements may be electrically insulated from each other so that the vibration of the piezoelectric elements can be controlled separately. The vibration may be beamformed by applying different electrical signals to different piezoelectric elements, which results in different vibrations (e.g., different vibration magnitudes and/or different vibration directions) of the different piezoelectric elements. In an example, a piezoelectric element may receive a stronger electrical signal (e.g., higher electrical voltage) than another piezoelectric element. In another example, a piezoelectric element may receive an electrical signal (e.g., higher electrical voltage) having an opposite polarity from the electrical signal for another piezoelectric element. In yet another example, a piezoelectric element may receive an electrical signal, versus another piezoelectric element does not receive any electrical signal. The vibration of different piezoelectric element may form a wave that drives contaminants to move along a predetermined direction or towards a predetermined spot.

Even though the conductive layer 513 is positively charged in FIG. 5, the conductive layer 513 can also be negative charged. For instance, given that the positive polarity of the conductive layer 513 can attract contaminants having negative polarity, e.g., contaminants 560D and 560E shown in FIG. 5, the conductive layer 513 can be negatively charged later to drive the contaminants 560D and 560E away. When the conductive layer 513 is negatively charged, the conductive layer 517 may be positively charged, and an electrical potential is still present between the conductive layers 513 and 517 to drive the vibration of the piezoelectric layer.

In some embodiments, the conductive layer 513 may be charged in one or more charging cycles. Each cycle may include a positive charging followed by negative charging, or a negative charging followed by positive charging. Such a charging cycle can facilitate repelling both positively charged contaminants and negatively charged contaminants away from the conductive layer 513. The conductive layer 513 can also be charged in cycles that synchronize with the charging cycles of the conductive layer 513 so that when the conductive layer 513 is positively charged, the conductive layer 517 is negatively charged, and when the conductive layer 513 is negatively charged, the conductive layer 517 is positively charged. The charging cycles can be facilitated by the charging module 540.

The contaminant detector 520 may detect contaminants in an environment surrounding the sensor 550. The contaminants include the contaminants 560A-560E. For purpose of simplicity and illustration, FIG. 5A shows the five contaminants 560A-560E. In other embodiments, the contaminant detector 520 can detect different, more, or fewer contaminants. The contaminants 560A-560E may be mobile particles that can accumulate on the surface 555 of the sensor 550 and contaminate the surface 555. The contaminant detector 520 can detect electrical polarities of the contaminants 560A-560E. The contaminant detector 520 may be an embodiment of the contaminant detector 250 in FIG. 2. In some embodiments, the contaminant detector 520 may be controlled the onboard computer 150, e.g., through the sensor interface 320 of the onboard computer 150. For instance, the onboard computer 150 may send a request for sensor data to the contaminant detector 520 and the contaminant detector 520, in response to receiving the request, detects contaminants or polarity of contaminants in the environment.

The contaminant detector 520 may provide sensor data capturing the contaminants 560A-560E to the onboard computer 150 for the onboard computer 150 to determine whether the surface 555 needs cleaning. The contaminant detector 520 may also providing sensor data capturing polarity of the contaminants 560A-560E to the polarity sensing module 530.

The polarity sensing module 530 determines of polarities of charges to be provided to the conductive layers 513 and 517 based on data from the contaminant detector 520. In some embodiments, the polarity sensing module 530 receives sensor data from the contaminant detector 520 as an input and outputs an electrical polarity for the conductive layer 513 and another electrical polarity (e.g., an opposite polarity) for the conductive layer 517. For instance, the polarity sensing module 530 determines a net polarity of the contaminants 560A-560E based on the data from the contaminant detector 520. In the embodiments of FIG. 5, as three contaminants 560A-560C are positively polarized and two contaminants 560D and 560E are negatively polarized, the net polarity of the 560A-560E is positive. The polarity sensing module 530 can provide the determined polarity to the charging module 540 and instructs the charging module 540 to provide charges of the determined polarity to the conductive layer 513 and to provide charges of the opposite polarity to the conductive layer 517.

The charging module 540 charges the conductive layers 513 and 517, e.g., based on the electrical polarities determined by the polarity sensing module 530. In some embodiments, the charging module 540 may include or be coupled with a power supply, such as a battery, an electrical outlet, etc. The power supply can provide a supply voltage. The charging module 540 provides a connection from the power supply to the conductive layers 513 and 517 so that the conductive layers 513 and 517 can be charged. The charging module 540 can control the connection from the power supply to the conductive layers 513 and 517 to control polarity of the conductive layers 513 and 517. For instance, the conductive layer 513 can be positively charge if it is coupled to the positive terminal of the power supply, versus the conductive layer 513 can be negatively charge if it is coupled to the negative terminal of the power supply. The conductive layers 517 may be coupled to the other terminal of the power supply. In some embodiments, a voltage between the conductive layers 513 and 517 may equal the supply voltage, e.g., a voltage between the positive terminal and negative terminal of the power supply.

In alternative embodiments, the charging module 540 may include a charge pump. The charge pump can change (e.g., raise or lower) the supply voltage from the power supply and provide a different voltage to the conductive layers 513 and 517. The charge pump may include a switching device that controls the connection from the power supply to the conductive layers 513 and 517 through one or more capacitors. In an embodiment, the capacitor may be initially coupled to the power supply and be charged to the supply voltage. After the capacitor is charged, the switching device can change the configuration of the circuit so that the capacitor is in series with the power supply and the conductive layers 513 and 517. That way the voltage between the conductive layers 513 and 517 can be two times of the supply voltage, i.e., the sum of the supply voltage and the capacitor voltage. In an alternative embodiment, the switching device may change the configuration of the circuit in a different way so that the voltage between the conductive layers 513 and 517 may be lower than the supply voltage. A ratio of the voltage between the conductive layers 513 and 517 to the supply voltage may be 1:3, 1:2, 1:1, 2:1, 3:1, or other ratios.

In some embodiments, the charging module 540 can charge the conductive layers 513 and 517 in one or more charging cycles. Specifications of the charging cycles (e.g., polarities, time duration of each charging cycle, the number of charging cycles, etc.) may be determined by the sensor cleaning module 350 of the onboard computer 150 or the charging module 540. The number of charging cycles needed for cleaning the sensor 550 can be determined based on data indicating a density of contaminants in the environment (e.g., from the contaminant detector 520) or data indicating an amount of contaminants accumulated on the surface 555 (e.g., from the sensor 550). In alternative embodiments, the charging module 540 may repeat the cycle till a threshold condition is met. The threshold condition may be a threshold number of cycles, a threshold level of cleanliness of the surface 555, and so on.

Figure 6:
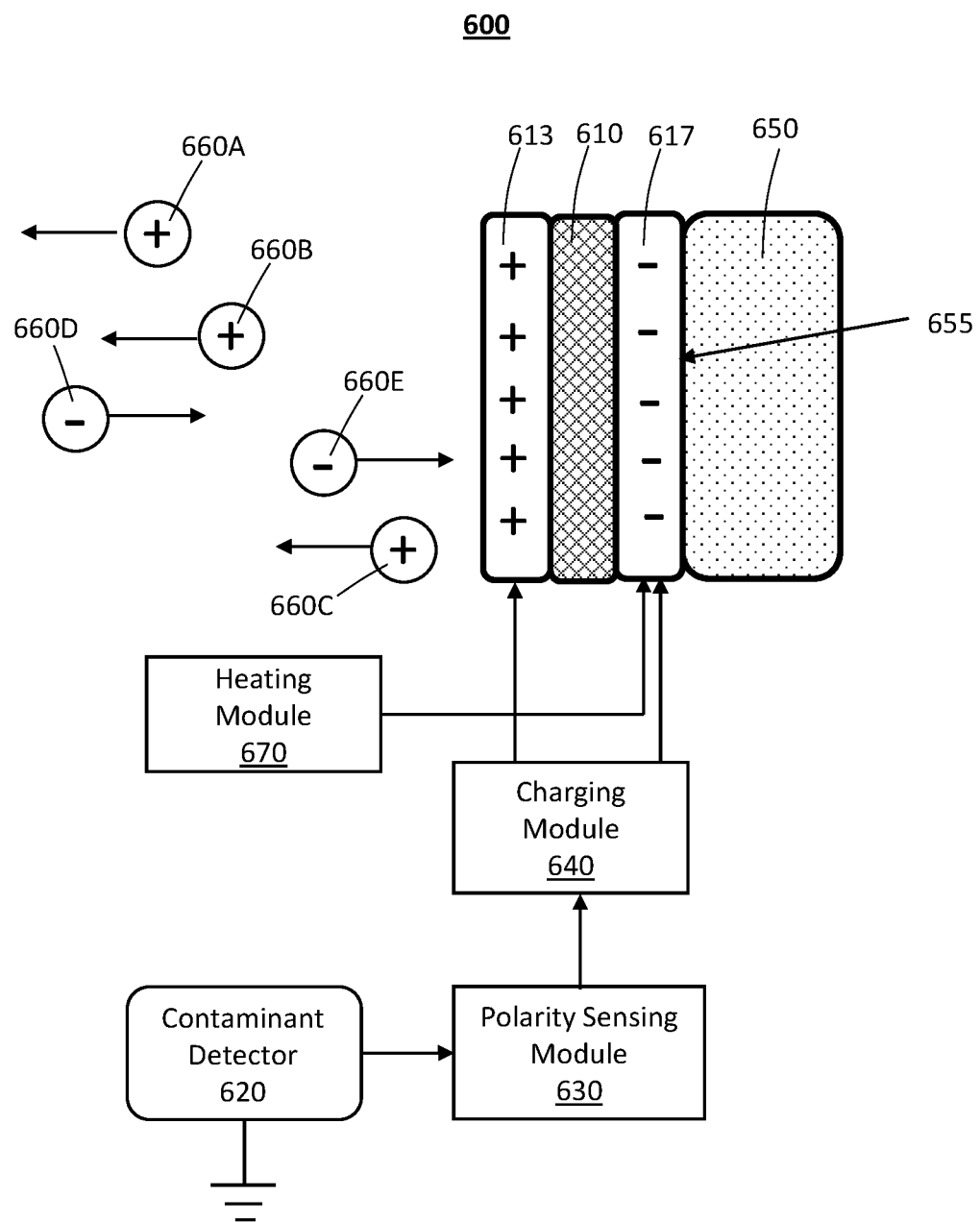
FIG. 6 illustrates an example sensor cleaning assembly including a heating module, according to some embodiments of the present disclosure.

FIG. 6 illustrates another example sensor cleaning assembly 600 including a heating module 670, according to some embodiments of the present disclosure. The sensor cleaning assembly 600 also includes a piezoelectric layer 610, conductive layers 613 and 617, a contaminant detector 620, a polarity sensing module 630, a charging module 640, and a heating module 670. In other embodiments, the sensor cleaning assembly 600 may include different, fewer, or more components. Also, functionality attributed to a component of the sensor cleaning assembly 600 may be accomplished by a different component included in the sensor cleaning assembly 600 or a different system than those illustrated, such as the onboard computer 150. For example, some or all functions of the polarity sensing module 630 may be performed by a sensor cleaning module, e.g., the sensor cleaning module 350, in the onboard computer 150.

The piezoelectric layer 610 is between the two conductive layers 613 and 617. The piezoelectric layer 610 is affixed onto the conductive layers 613 and 617, e.g., through an adhesive agent. The conductive layer 617 is affixed on to a surface 655 of a sensor 650, e.g., through the same or a different adhesive agent. The conductive layer 613 is further from the surface 655 and faces the outside. The sensor 650 may be the same or similar as the sensor 450. The conductive layer 613 or 617 may be the same as or similar to the conductive layer 410 in FIG. 4. The piezoelectric layer 610, the conductive layers 613 and 617, and the adhesive agents (if any) may be transparent to the light wavelength(s) that the sensor 450 detects. The piezoelectric layer 610, conductive layer 613, conductive layer 617, or adhesive agents may be transparent to other wavelengths. Alternatively, the piezoelectric layer 610, conductive layer 613, conductive layer 617, or adhesive agents may block other wavelengths and function as a filter that allows specific wavelengths (e.g., wavelengths that the sensor 450 is designed to detect) to pass through. That way, the light can pass through them to reach the surface 655 of the sensor 650. The piezoelectric layer 610 may be an embodiment of the piezoelectric layer 510 in FIG. 5. The conductive layer 613 may be an embodiment of the conductive layer 513 in FIG. 5. The conductive layer 617 may be an embodiment of the conductive layer 517 in FIG. 5.

The conductive layer 613 in the sensor cleaning assembly 600 can be charged to drive contaminants away from the sensor 650. As shown in FIG. 6, the conductive layer 613 is positively charged and has a positive polarity. The conductive layer 613 drives away contaminants 460A-460C that also have positive polarity. The conductive layer 617 has an opposite polarity from the conductive layer 613. As shown in FIG. 6, the conductive layer 617 is negatively charged and has a negative polarity. An electric field is present between the conductive layers 613 and 617. The electric field can trigger a piezoelectric effect (e.g., a reverse piezoelectric effect) in the piezoelectric layer 610.

The piezoelectric layer 610 includes a piezoelectric material. The piezoelectric material may exhibit reverse piezoelectric effect, i.e., a mechanical strain can be generated inside the piezoelectric material when the piezoelectric material receives an electrical signal, e.g., The electrical filed present between the conductive layers 613 and 617 is applied on the piezoelectric layer 610 and causes a mechanical strain in the piezoelectric layer 610. The mechanical strain can change the shape or size of the piezoelectric layer 610, resulting a vibration of the piezoelectric layer 610. The vibration can be transferred to the conductive layer 613 as the piezoelectric layer 610 is affixed on the conductive layer 613. The vibration can facilitate repelling contaminants from the conductive layer 613 and thereby enhance the effectiveness of the cleaning.

The effectiveness of the cleaning can be further enhanced by heating up the conductive layer 617. The heating module 670 can increase the temperature of the conductive layer 617. The heating can enhance the cleaning, e.g., in cold and humid environments. The heating module 670 may be a heating circuit. The heating module 670 may be triggered based on a determination that a temperature of the environment is below a threshold temperature or that a humidity level of the environment is above a threshold humidity level. In some embodiments, the heating module 670 heats the conductive layer 617 by providing an electrical current (e.g., DC current) flow through a surface of the conductive layer 617 to create heating effect.

In alternative embodiments, the heating module 670 heats the conductive layer 617 by delivering a heat to the conductive layer 617. The heating module 670 may include a heat source (e.g., an object that can be heated by electricity) and a heat transfer channel (e.g., thermally conductive coils, etc.) that connects the heat source to the conductive layer 617. That way, heat from the heat source can be transferred to the conductive layer 617 through the heat transfer channel. Even though the heating module 670 is separated from the conductive layer 617 in FIG. 6, the heating module 670 may be affixed to conductive layer 617 in alternative configurations. The heating module 670 can be heated up and heat can be transferred directly from the heating module 670 to the conductive layer 617.

With the increased temperature, the magnitude of the vibration of the piezoelectric layer 610 can be increased even when the same electrical voltage is applied to the conductive layers 613 and 617. Also, as the temperature of the piezoelectric layer 610 increases, the temperature of the conductive layer 613 can also be increased, e.g., due to heat transfer from the piezoelectric layer 610 to the conductive layer 613. The higher temperature of the conductive layer 613 can enhance repelling of contaminants. In some embodiments, the piezoelectric layer 610 is heated while an electric field is applied to the conductive layers 613 and 617. In alternative embodiments, the piezoelectric layer 610 may be heated absent an electric field between the conductive layers 613 and 617.

Even though the conductive layer 613 is positively charge in FIG. 6, the conductive layer 613 can also be negative charged. For instance, given that the positive polarity of the conductive layer 613 can attract contaminants having negative polarity, e.g., contaminants 660D and 660E shown in FIG. 6, the conductive layer 613 can be negatively charge later to drive the contaminants 660D and 660E away. When the conductive layer 613 is negatively charged, the conductive layer 617 may be positively charge, and an electrical potential is still present between the conductive layers 613 and 617 to drive the vibration of the piezoelectric layer.

In some embodiments, the conductive layer 613 may be charged in one or more charging cycles. Each cycle may include a positive charging followed by negative charging, or a negative charging followed by positive charging. Such a charging cycle can facilitate repelling both positively charged contaminants and negatively charged contaminants away from the conductive layer 613. The conductive layer 613 can also be charged in cycles that synchronize with the charging cycles of the conductive layer 613 so that when the conductive layer 613 is positively charged, the conductive layer 617 is negatively charged, and when the conductive layer 613 is negatively charged, the conductive layer 617 is positively charged. The charging cycles can be facilitated by the charging module 640.

The contaminant detector 620 may detect contaminants in an environment surrounding the sensor 650. The contaminants include the contaminants 660A-660E. For purpose of simplicity and illustration, FIG. 6 shows the five contaminants 660A-660E. In other embodiments, the contaminant detector 620 can detect different, more, or fewer contaminants. The contaminants 660A-660E may be mobile particles that can accumulate on the surface 655 of the sensor 650 and contaminate the surface 655. The contaminant detector 620 can detect electrical polarities of the contaminants 660A-660E. The contaminant detector 620 may be the same or similar as the contaminant detector 520.

The polarity sensing module 630 determines of polarities of charges to be provided to the conductive layers 613 and 617 based on data from the contaminant detector 620. The polarity sensing module 630 may be the same or similar as the polarity sensing module 530. The charging module 640 charges the conductive layers 613 and 617, e.g., based on the electrical polarities determined by the polarity sensing module 630. The charging module 640 may be the same or similar as the charging module 540.

Figure 7:
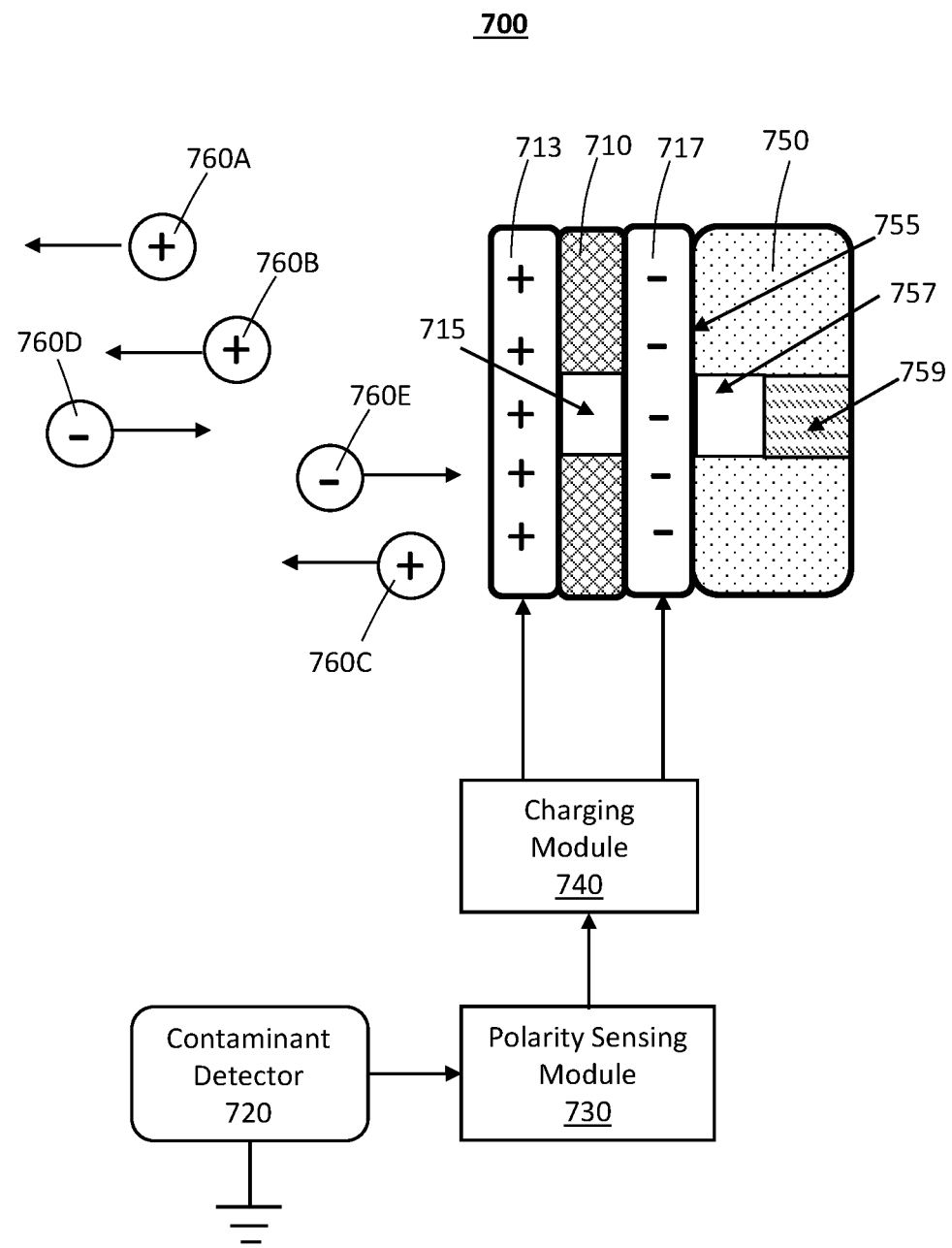
FIG. 7 illustrates yet another example sensor cleaning assembly including a piezoelectric layer, according to some embodiments of the present disclosure.

FIG. 7 illustrates yet another example sensor cleaning assembly 700 including a piezoelectric layer 710, according to some embodiments of the present disclosure. The sensor cleaning assembly 700 also includes conductive layers 713 and 717, a contaminant detector 720, a polarity sensing module 730, and a charging module 740. In other embodiments, the sensor cleaning assembly 700 may include different, fewer, or more components. Also, functionality attributed to a component of the sensor cleaning assembly 700 may be accomplished by a different component included in the sensor cleaning assembly 700 or a different system than those illustrated, such as the onboard computer 150. For example, some or all functions of the polarity sensing module 730 may be performed by a sensor cleaning module, e.g., the sensor cleaning module 350, in the onboard computer 150.

The piezoelectric layer 710 is between the two conductive layers 713 and 717. The piezoelectric layer 710 is affixed onto a portion of each the conductive layers 713 and 717, e.g., through an adhesive agent. The conductive layer 717 is affixed on to a surface 755 of a sensor 750, e.g., through the same or a different adhesive agent. The conductive layer 713 is further from the surface 755 and faces the outside. The piezoelectric layer 710 has an opening. The opening 715 extends from a surface of the piezoelectric layer 710 that contacts the conductive layer 713 to the other surface of the piezoelectric layer 710 that contacts the conductive layer 717. The opening 715 is over an opening 757 of the sensor 750. Light can pass through the conductive layer 713, the opening 715 of the piezoelectric layer 710, and the conductive layer 717 to reach the opening 757 of the sensor 750. The opening 715 of the piezoelectric layer 710 can avoid optical distortion (e.g., color distortion, absorption of light, reflection of light, etc.) caused by the piezoelectric layer 710. The light can reach another component 759 of the sensor 750 without going through the piezoelectric material of the piezoelectric layer 710. In an example where the sensor 750 is a camera, the opening 757 may be an aperture of the camera, and the component 759 may include an array of photodiodes that can convert photons to charges.

The sensor 750 may be the same or similar as the sensor 450. The conductive layer 713 or 717 may be the same as or similar to the conductive layer 410 in FIG. 4. The piezoelectric layer 710, the conductive layers 713 and 717, and the adhesive agents (if any) may be transparent so that light can pass through them to reach the surface 755 of the sensor 750. The piezoelectric layer 710 may be an embodiment of the piezoelectric layer 510 in FIG. 5. The conductive layer 713 may be an embodiment of the conductive layer 513 in FIG. 5. The conductive layer 717 may be an embodiment of the conductive layer 517 in FIG. 5.

The conductive layer 713 in the sensor cleaning assembly 700 can be charged to drive contaminants away from the sensor 750. As shown in FIG. 7, the conductive layer 713 is positively charged and has a positive polarity. The conductive layer 713 drives away contaminants 460A-460C that also have positive polarity. The conductive layer 717 has an opposite polarity from the conductive layer 713. As shown in FIG. 7, the conductive layer 717 is negatively charged and has a negative polarity. An electric field is present between the conductive layers 713 and 717. The electric field can trigger a piezoelectric effect (e.g., a reverse piezoelectric effect) in the piezoelectric layer 710.

The piezoelectric layer 710 includes a piezoelectric material. The piezoelectric material may exhibit reverse piezoelectric effect, i.e., a mechanical strain can be generated inside the piezoelectric material when the piezoelectric material receives an electrical signal, e.g., The electrical filed present between the conductive layers 713 and 717 is applied on the piezoelectric layer 710 and causes a mechanical strain in the piezoelectric layer 710. The mechanical strain can change the shape or size of the piezoelectric layer 710, resulting a vibration of the piezoelectric layer 710. The vibration can be transferred to the conductive layer 713 as the piezoelectric layer 710 is affixed on the conductive layer 713. The vibration can facilitate repelling contaminants from the conductive layer 713 and thereby enhance the effectiveness of the cleaning.

Even though the conductive layer 713 is positively charge in FIG. 7, the conductive layer 713 can also be negative charged. For instance, given that the positive polarity of the conductive layer 713 can attract contaminants having negative polarity, e.g., contaminants 760D and 760E shown in FIG. 7, the conductive layer 713 can be negatively charge later to drive the contaminants 760D and 760E away. When the conductive layer 713 is negatively charged, the conductive layer 717 may be positively charge, and an electrical potential is still present between the conductive layers 713 and 717 to drive the vibration of the piezoelectric layer.

In some embodiments, the conductive layer 713 may be charged in one or more charging cycles. Each cycle may include a positive charging followed by negative charging, or a negative charging followed by positive charging. Such a charging cycle can facilitate repelling both positively charged contaminants and negatively charged contaminants away from the conductive layer 713. The conductive layer 713 can also be charged in cycles that synchronize with the charging cycles of the conductive layer 713 so that when the conductive layer 713 is positively charged, the conductive layer 717 is negatively charged, and when the conductive layer 713 is negatively charged, the conductive layer 717 is positively charged. The charging cycles can be facilitated by the charging module 740.

The contaminant detector 720 may detect contaminants in an environment surrounding the sensor 750. The contaminants include the contaminants 760A-660E. For purpose of simplicity and illustration, FIG. 7 shows the five contaminants 760A-660E. In other embodiments, the contaminant detector 720 can detect different, more, or fewer contaminants. The contaminants 760A-660E may be mobile particles that can accumulate on the surface 755 of the sensor 750 and contaminate the surface 755. The contaminant detector 720 can detect electrical polarities of the contaminants 760A-660E. The contaminant detector 720 may be the same or similar as the contaminant detector 520.

The polarity sensing module 730 determines of polarities of charges to be provided to the conductive layers 713 and 717 based on data from the contaminant detector 720. The polarity sensing module 730 may be the same or similar as the polarity sensing module 530. The charging module 740 charges the conductive layers 713 and 717, e.g., based on the electrical polarities determined by the polarity sensing module 730. The charging module 740 may be the same or similar as the charging module 540.

Figure 8:
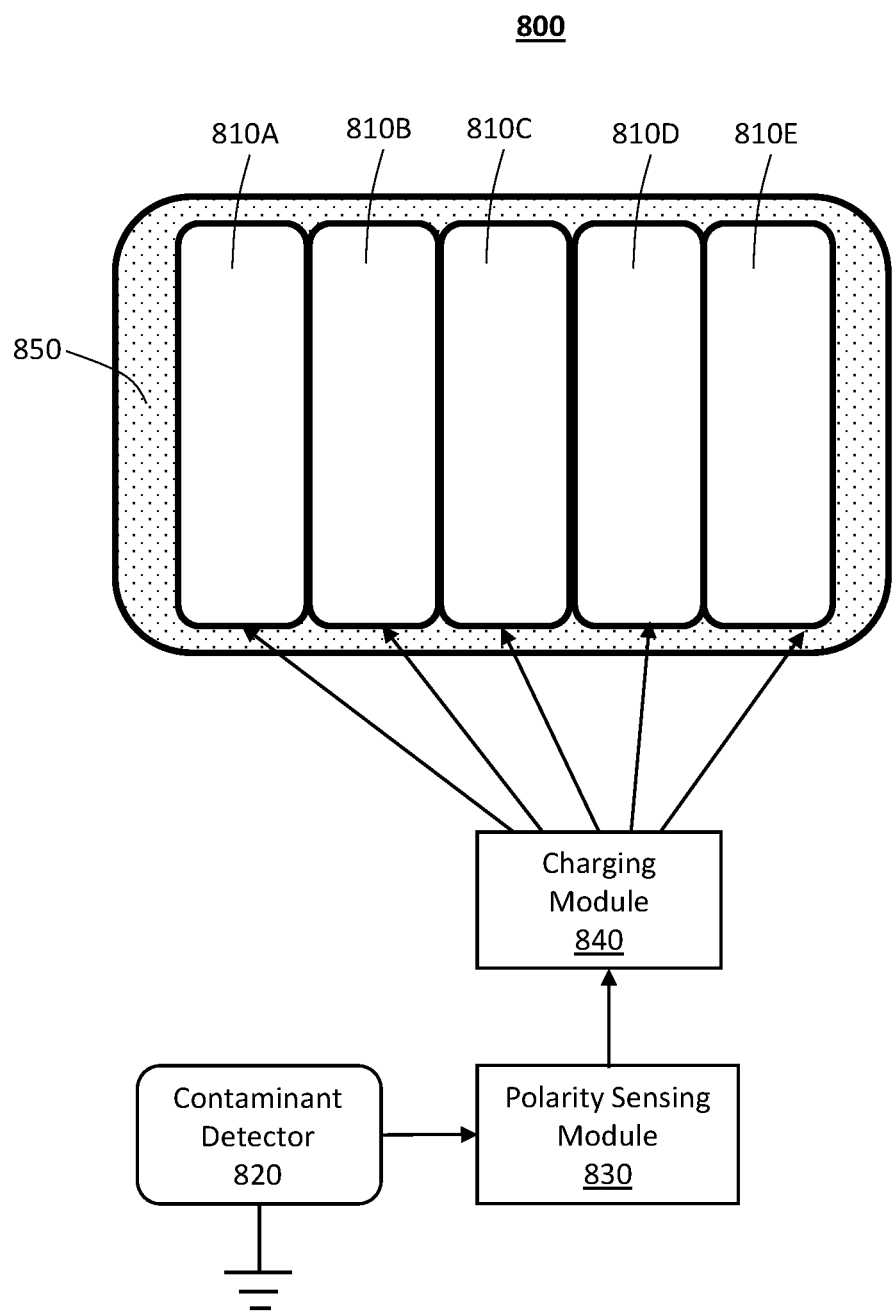
FIG. 8 illustrates yet an example sensor cleaning assembly including an array of cleaning pads, according to some embodiments of the present disclosure.

FIG. 8 illustrates yet an example sensor cleaning assembly 800 including an array of cleaning pads 810A-810E (collectively referred to as "cleaning pads 810" or "cleaning pad 810"), according to some embodiments of the present disclosure. The sensor cleaning assembly 800 also includes a contaminant detector 820, a polarity sensing module 830, and a charging module 840. In other embodiments, the sensor cleaning assembly 800 may include different, fewer, or more components. Also, functionality attributed to a component of the sensor cleaning assembly 800 may be accomplished by a different component included in the sensor cleaning assembly 800 or a different system than those illustrated, such as the onboard computer 150. For example, some or all functions of the polarity sensing module 830 may be performed by a sensor cleaning module, e.g., the sensor cleaning module 350, in the onboard computer 150. As another example, the sensor cleaning assembly 800 may include a different number of cleaning pads 810.

The cleaning pads 810 are affixed to a sensor 850. Each cleaning pad 810 is affixed to a different portion of the sensor 850. The sensor 850 may be the same or similar as the sensor 450. A cleaning pad 810 may include one or more conductive layers, one or more piezoelectric layers, and so on. Examples of a cleaning pad 810 include the conductive layer 410 in FIG. 4, the combination of the piezoelectric layer 510 and the conductive layers 513 and 517 in FIG. 5, the combination of the piezoelectric layer 610 and the conductive layers 613 and 617 in FIG. 6, the combination of the piezoelectric layer 710 and the conductive layers 713 and 717 in FIG. 7, and so on. Different cleaning pads 810 may be different. For instance, a cleaning pad 810 may be the conductive layer 410 in FIG. 4, versus another cleaning pad 810 may include the piezoelectric layer 710 and the conductive layers 713 and 717 in FIG. 7. In FIG. 8, the cleaning pads 810 are arranged in a row. In other embodiments, cleaning pads 810 can also be arranged in a column or arranged in columns and rows.

In some embodiments, each cleaning pad 810 includes a conductive layer, such as the conductive layer 410, the conductive layer 513, the conductive layer 517, the conductive layer 613, the conductive layer 617, the conductive layer 713, or the conductive layer 717. The conductive layer can be charged positively, negatively, or both to repel contaminants away from the cleaning pad 810. Adjacent cleaning pads 810 may be separated by an electrical insulator so that the cleaning pads 810 can be charged separately. For instance, the cleaning pads 810 can be charged at different times. At a same time, different cleaning pads 810 can be charged with different polarities, or a cleaning pad 810 is charged but another cleaning pad 810 is not charged.

In some embodiments, the cleaning pads 810 are sequentially charged. The sequence of charging the cleaning pads 810 may be determined by the sensor cleaning module 350 or the charging module 840. During each charging in the sequence, one or more of the cleaning pads 810 may be charged, but the rest of the cleaning pads 810 may be uncharged. In an embodiment, the sequence may follow the order in which the cleaning pads 810 are ordered in the array. For example, the sequence starts with the cleaning pad 810A, then the cleaning pad 810B, then the cleaning pad 810C, then the cleaning pad 810D, and finally the cleaning pad 810E. As another example, the sequence starts with the cleaning pad 810E, then the cleaning pad 810D, then the cleaning pad 810C, then the cleaning pad 810B, and finally the cleaning pad 810A.

In another embodiment, the sequence starts with the cleaning pad 810C, which is located at the middle of the array. After the cleaning pad 810C is charged, the cleaning pad 810B or 810D (or both), which is adjacent to the cleaning pad 810C is charged. After the cleaning pad 810B or 810D is charged, the cleaning pad 810A or 810E (or both), which is adjacent to the cleaning pad 810B or 810D, is then charged. Sequentially charging the cleaning pads 810 may provide more effective cleaning of the sensor 850 than charging all the cleaning pads 810 at the same time. As a cleaning pad 810 is charged, contaminants may be pushed to an adjacent cleaning pad 810, which can cause new contamination to the adjacent cleaning pad 810. As the adjacent cleaning pad 810 is charged later, the new contamination can be removed.

The contaminant detector 820 may detect contaminants in an environment surrounding the sensor 850. The contaminants include the contaminants 860A-660E. For purpose of simplicity and illustration, FIG. 8 shows the five contaminants 860A-660E. In other embodiments, the contaminant detector 820 can detect different, more, or fewer contaminants. The contaminants 860A-660E may be mobile particles that can accumulate on the surface 855 of the sensor 850 and contaminate the surface 855. The contaminant detector 820 can detect electrical polarities of the contaminants 860A-660E. The contaminant detector 820 may be the same or similar as the contaminant detector 520.

The polarity sensing module 830 determines of polarities of charges to be provided to the conductive layers 813 and 817 based on data from the contaminant detector 820. The polarity sensing module 830 may be the same or similar as the polarity sensing module 530. The charging module 840 charges the conductive layers 813 and 817, e.g., based on the electrical polarities determined by the polarity sensing module 830. The charging module 840 may be the same or similar as the charging module 540.

Example Fleet Management System

Figure 9:
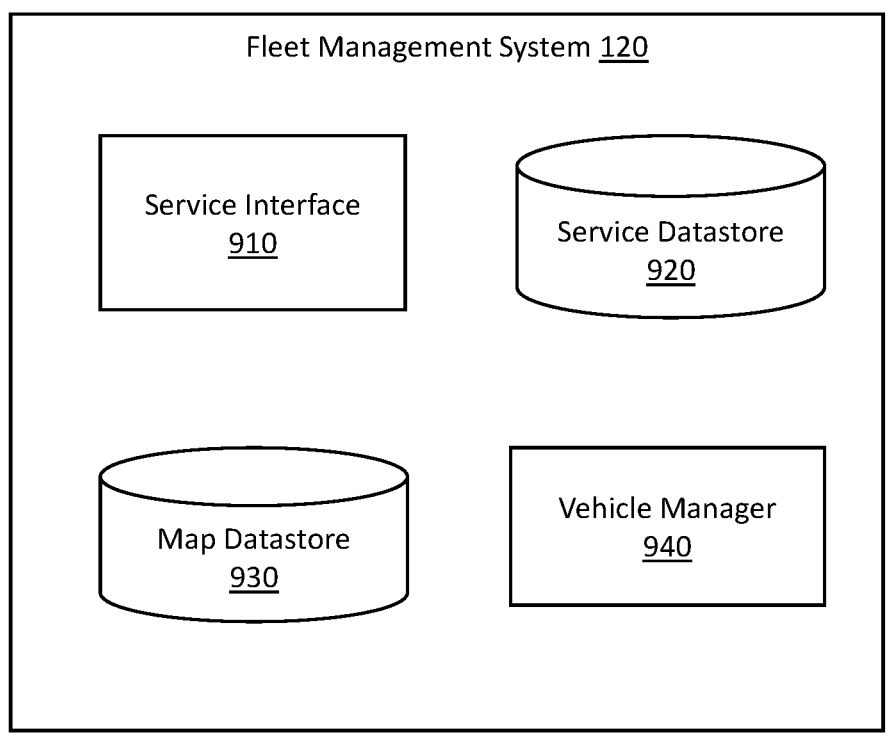
FIG. 9 is a block diagram showing a fleet management system, according to some embodiments of the present disclosure.

FIG. 9 is a block diagram showing the fleet management system 120, according to some embodiments of the present disclosure. As shown in FIG. 9, the fleet management system 120 includes a service interface 910, a service datastore 920, a map datastore 930, and a vehicle manager 940. In alternative configurations, different and/or additional components may be included in the fleet management system 120. Further, functionality attributed to one component of the fleet management system 120 may be accomplished by a different component included in the fleet management system 120 or a different system than those illustrated, such as the onboard computer 150.

The service interface 910 provides interfaces that allows users (e.g., users 135) to request services that can be provided by AVs associated with the fleet management system 120. In some embodiments, the service interface 910 provides the interfaces to user devices, such as user devices 130. For example, the service interface 910 may provide one or more apps or browser-based interfaces that can be accessed by users, such as the users 135, using user devices. The service interface 910 enables the users to submit service requests provided or enabled by the fleet management system 120 through the interfaces.

The service datastore 920 stores data associated with services managed by the fleet management system 120. The service datastore 920 may store information associated with services that the fleet of AVs can provide. The service datastore 920 may store historical service data. For instance, the service datastore 920 may also store service requests that have been made by users. The service datastore 920 may also store information of services that is being performed or has been completed, such as status of service, time when the service was completed, and so on. In some cases, the service datastore 920 may further include future service data, e.g., a future service that a user has scheduled with the fleet management system 120. In some embodiments, service data stored in the service datastore 920 may be associated with user accounts maintained by the fleet management system 120. A user may make service requests or access information of historical service requests through the account of the user.

The map datastore 930 stores a detailed map of environments through which the fleet of AVs may travel. The map datastore 930 may include some or all data stored in map datastores of the AVs, e.g., the map datastore 310. Some of the map datastore 930 may be gathered by a fleet of AVs. For example, images obtained by exterior cameras of the AVs may be used to learn information about the AVs' environments. The images may be processed to identify particular features in the environment. Such features may include road conditions, such as road curve, bumps, traffic lights, traffic cones etc. The fleet management system 120 and/or AVs may have one or more image processing modules to identify features in the captured images or other sensor data. This feature data may be stored in the map datastore 930. In some embodiments, certain feature data (e.g., features that are expected to be temporary) may expire after a certain period of time. In some embodiments, data captured by an AV 110 (e.g., a different AV) may indicate that a previously-observed feature is no longer present (e.g., a traffic cone has been removed) and in response, the fleet management system 120 may remove this feature from the map datastore 930.

The vehicle manager 940 manages and communicates with the fleet of AVs 110. The vehicle manager 940 assigns the AVs 110 to various tasks (e.g., service tasks) and directs the movements of the AVs 110 in the fleet. In some embodiments, the vehicle manager 940 may direct the movements of the AVs 110 in the fleet based on data in the map datastore 930. In some embodiments, the vehicle manager 940 may instruct AVs 110 to drive to other locations while not servicing a user, e.g., to improve geographic distribution of the fleet, to anticipate demand at particular locations, etc. The vehicle manager 940 may also instruct AVs 110 to return to an AV 110 facility for fueling, inspection, maintenance, or storage. The vehicle manager 940 may perform some or all of the functions of the onboard computer 150 that are described above in conjunction with FIGS. 1 and 3.

In some embodiments, the vehicle manager 940 selects AVs from the fleet to perform various tasks and instructs the AVs to perform the tasks. In some embodiments, the vehicle manager 940 selects an AV 110 based on availability of the AV 110. For example, the vehicle manager 940 may determine that the AV 110 is available based on a determination that the AV 110 the AV 110 is not performing any task or is going to perform any task that has been assigned to the AV 110. In cases where a service request specifies a time window for the service, the vehicle manager 940 may determine that the AV 110 is available in the time window. The vehicle manager 940 may select one of the available AVs based on other factors, such as physical proximity.

The vehicle manager 940 or another system may maintain or access data describing each of the AVs in the fleet of AVs 110, including current location, service status (e.g., whether the AV 110 is available or performing a service; when the AV 110 is expected to become available; whether the AV 110 is schedule for future service), fuel or battery level, etc. The vehicle manager 940 may select AVs for service in a manner that optimizes one or more additional factors, including fleet distribution, fleet utilization, and energy consumption. The vehicle manager 940 may interface with one or more predictive algorithms that project future service requests and/or vehicle use, and select vehicles for services based on the projections.

The vehicle manager 940 transmits instructions dispatching the selected AVs. In particular, the vehicle manager 940 instructs a selected AV 110 to drive autonomously to a location. For instance, the vehicle manager 940 may generates a navigation instruction based on the location and provide the navigation instruction to the selected AV, which will then navigate to the location accordingly. The navigation instruction may include the location itself, a navigation route from another location to the location, road condition information, motion parameters, other types of navigation information, or some combination thereof.

Example Methods of Cleaning AV Sensor

Figure 10:
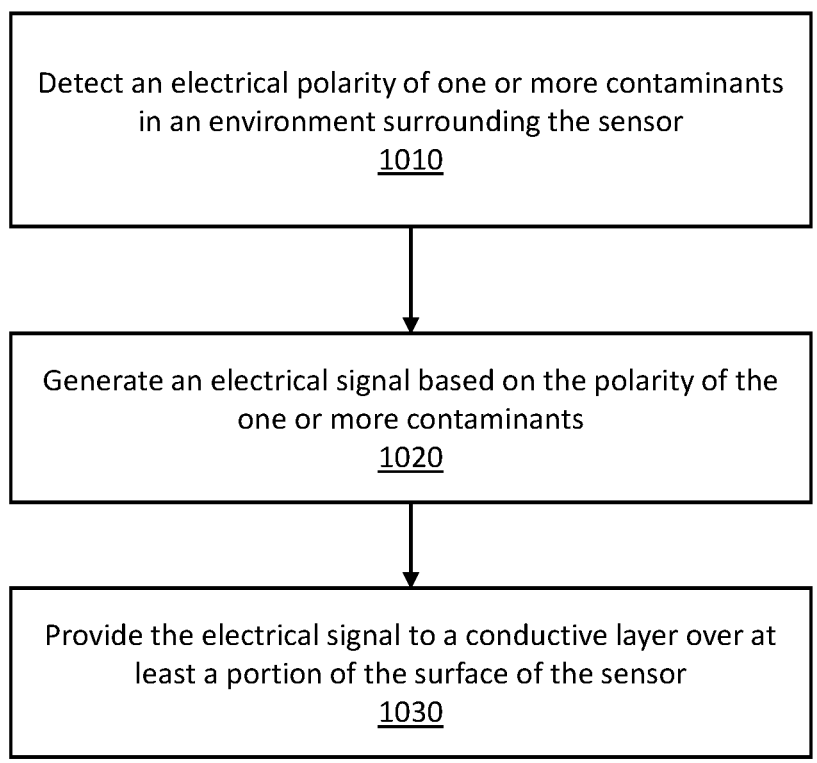
FIG. 10 is a flowchart showing a method of cleaning a sensor of a vehicle, according to some embodiments of the present disclosure.

FIG. 10 is a flowchart showing a method 1000 of cleaning a sensor of a vehicle, according to some embodiments of the present disclosure. The method 1000 may be performed by the sensor cleaning assembly 400. Although the method 1000 is described with reference to the flowchart illustrated in FIG. 10, many other methods of cleaning a sensor of a vehicle may alternatively be used. For example, the order of execution of the steps in FIG. 10 may be changed. As another example, some of the steps may be changed, eliminated, or combined.

The sensor cleaning assembly 400 detects, in 1010, an electrical polarity of one or more contaminants in an environment surrounding the sensor. In some embodiments, the sensor cleaning assembly 400 may determines, e.g., before it detects the electrical polarity, that the surface of the sensor needs cleaning. In some embodiments, the sensor cleaning assembly 400 may determine that the surface of the sensor needs cleaning based on an instruction from the onboard computer 150. In alternative embodiments, the sensor cleaning assembly 400 may determine that the surface of the sensor needs cleaning based on sensor data captured by the sensor.

The sensor cleaning assembly 400 generates, in 1020, an electrical signal based on the polarity of the one or more contaminants. A polarity of the electrical signal may be the same as the polarity of the one or more contaminants. In some embodiments, the electrical signal has two alternating polarities. A first polarity of the two alternating polarities is the same as the electrical polarity of the one or more contaminants, and a second polarity of two alternating polarities is the same as the electrical polarity of the one or more contaminants.

The conductive layer may be a first conductive layer, the electrical signal may be a first electrical signal. The sensor cleaning assembly 400 may generate a second electrical signal and provide the second electrical signal to a second conductive layer over the surface of the sensor. A piezoelectric layer may be arranged between the first conductive layer and the second conductive layer. The sensor cleaning assembly 400 can increase a temperature of the piezoelectric layer. In some embodiments, the piezoelectric layer has an opening over at least a portion of the first conductive layer.

In some embodiments, the conductive layer is a conductive layer in an array of conductive layers. Different conductive layers in the array are over different portions of the surface of the sensor. The conductive layers in the array are electrically insulated from each other. The sensor cleaning assembly 400 can provide a sequence of electrical signals to the conductive layers in the array. Each respective electrical signal in the sequence is provided to a different conductive layer in the array at a different time. The sensor cleaning assembly 400 can determine the sequence based on locations of the conductive layers in the array.

The onboard computer 150 provides, in 1030, the electrical signal to a conductive layer over at least a portion of the surface of the sensor. The electrical signal is configured to repel the one or more contaminants away from the conductive layer. The vehicle is configured to navigate based on data captured by the sensor.

Select Examples

Example 1 provides a method for cleaning a sensor of a vehicle, including: detecting an electrical polarity of one or more contaminants in an environment surrounding the sensor; generating an electrical signal based on the polarity of the one or more contaminants; and providing the electrical signal to a conductive layer over at least a portion of a surface of the sensor, where the electrical signal is to repel the one or more contaminants away from the conductive layer, and the vehicle is to navigate based on data captured by the sensor.

Example 2 provides the method of example 1, where a polarity of the electrical signal is the same as the polarity of the one or more contaminants.

Example 3 provides the method of example 1, where: the electrical signal has two polarities, a first polarity of the two polarities is the same as the electrical polarity of the one or more contaminants, and a second polarity of two polarities is the same as the electrical polarity of the one or more contaminants.

Example 4 provides the method of example 1, where the conductive layer is a first conductive layer, the electrical signal is a first electrical signal, and the method further including: generating a second electrical signal; and providing the second electrical signal to a second conductive layer over the surface of the sensor, where a piezoelectric layer is between the first conductive layer and the second conductive layer.

Example 5 provides the method of example 4, further including: increasing a temperature of the piezoelectric layer.

Example 6 provides the method of example 4, where the piezoelectric layer has an opening over at least a portion of the first conductive layer.

Example 7 provides the method of example 1. The method further includes determining that the surface of the sensor needs cleaning based on sensor data capturing the one or more contaminants.

Example 8 provides the method of example 1, where: the conductive layer is a conductive layer in an array of conductive layers, different conductive layers in the array are over different portions of the surface of the sensor, and the conductive layers in the array are electrically insulated from each other.

Example 9 provides the method of example 8, further including: providing a sequence of electrical signals to the conductive layers in the array, where each respective electrical signal in the sequence is provided to a different conductive layer in the array at a different time.

Example 10 provides the method of example 9, further including: determining the sequence based on locations of the conductive layers in the array.

Example 11 provides an assembly for cleaning a sensor of a vehicle, including: a conductive layer over at least a portion of the sensor; a polarity sensing circuit to determine an electrical polarity of one or more contaminants in an environment surrounding the sensor; and a charging circuit to provide electrical charges of the electrical polarity to the conductive layer, where the conductive layer is to repel he one or more contaminants away from the sensor, and the vehicle is to navigate based on data captured by the sensor.

Example 12 provides the assembly of example 11, further including: a contaminant detector to detect the one or more contaminants.

Example 13 provides the assembly of example 11, where the conductive layer is a first conductive layer, and the assembly further includes: a second conductive layer over at least the portion of the sensor; and a piezoelectric layer between the first conductive layer and the second conductive layer.

Example 14 provides the assembly of example 13, further including: a heating circuit to increase a temperature of the piezoelectric layer.

Example 15 provides the assembly of example 13, where the piezoelectric layer includes an opening over an aperture of the sensor.

Example 16 provides the assembly of example 11, where the charging circuit includes a power supply that supply the charges to the conductive layer.

Example 17 provides the assembly of example 16, where the power supply has a first electrical voltage, and the charging circuit further includes a charge pump coupled to the power supply and to generate a second electrical voltage that is different from the first electrical voltage.

Example 18 provides an assembly for cleaning a sensor of a vehicle, including: an array of cleaning pads arranged, where each cleaning pad in the array is over a different portion of the sensor; a polarity sensing circuit to determine an electrical polarity of one or more contaminants in an environment surrounding the sensor; and a charging circuit to provide electrical charges of the electrical polarity to different cleaning pads in the array at different times, where the array of cleaning pads is to repel the one or more contaminants away from the sensor, and the vehicle is to navigate based on data captured by the sensor.

Example 19 provides the assembly of example 18, where the charging circuit is to provide the electrical charges of the electrical polarity to the different cleaning pads in the array at the different times by: providing electrical charges to the array of cleaning pads based on a sequence of charging the cleaning pads in the array, the sequence determined based on locations of the cleaning pads in the array.

Example 20 provides the assembly of example 18, where the cleaning pads in the array are electrically insulated from each other.

Other Implementation Notes, Variations, and Applications

It is to be understood that not necessarily all objects or advantages may be achieved in accordance with any particular embodiment described herein. Thus, for example, those skilled in the art will recognize that certain embodiments may be to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

What is claimed is:

1. A method for cleaning a sensor of a vehicle, comprising:
    detecting an electrical polarity of one or more contaminants in an environment surrounding the sensor;
    generating an electrical signal based on the electrical polarity of the one or more contaminants; and
    providing the electrical signal to a first conductive layer over at least a portion of a surface of the sensor,
    wherein the vehicle is to navigate based on data captured by the sensor; and
    wherein the vehicle includes an assembly for cleaning the sensor, comprising:
        a controller in communication with the sensor, the controller being configured to navigate the vehicle at least in part based on data received from the sensor; and
        wherein the assembly includes:
            the first conductive layer over at least a portion of the sensor and a second conductive layer over at least the portion of the sensor;
            a polarity sensing circuit to determine an electrical polarity of one or more contaminants in an environment surrounding the sensor;
            a charging circuit to provide electrical charges of the electrical polarity to the first conductive layer and to the second conductive layer, where a charge provided to the first conductive layer has an opposite polarity of a charge provided to the second conductive layer thereby forming an electric field between the two conductive layers,
                wherein the first conductive layer is configured to repel the one or more contaminants away from the sensor; and
            a piezoelectric layer between the first conductive layer and the second conductive layer, wherein the electric field causes the piezoelectric layer to vibrate.

2. The method of claim 1, wherein a polarity of the electrical signal is the same as the polarity of the one or more contaminants.

3. The method of claim 1, wherein:
    the electrical signal has two polarities,
    a first polarity of the two polarities is the same as the electrical polarity of the one or more contaminants, and
    a second polarity of two polarities is the same as the electrical polarity of the one or more contaminants.

4. The method of claim 1, wherein the conductive layer is a first conductive layer, the electrical signal is a first electrical signal, and the method further comprising:
    generating a second electrical signal; and
    providing the second electrical signal to a second conductive layer over the surface of the sensor,
    wherein a piezoelectric layer is between the first conductive layer and the second conductive layer.

5. The method of claim 4, further comprising:
    increasing a temperature of the piezoelectric layer.

6. The method of claim 4, wherein the piezoelectric layer has an opening over at least a portion of the first conductive layer.

7. The method of claim 1, further comprising:
    determining that the surface of the sensor needs cleaning based on sensor data capturing the one or more contaminants.

8. The method of claim 1, wherein:
    the conductive layer is a conductive layer in an array of conductive layers,
    different conductive layers in the array are over different portions of the surface of the sensor, and
    the conductive layers in the array are electrically insulated from each other.

9. The method of claim 8, further comprising:
    providing a sequence of electrical signals to the conductive layers in the array,
    wherein each respective electrical signal in the sequence is provided to a different conductive layer in the array at a different time.

10. The method of claim 9, further comprising:
    determining the sequence based on locations of the conductive layers in the array.

11. A vehicle including a sensor and an assembly for cleaning the sensor, comprising:
    a sensor;
    a controller in communication with the sensor, the controller being configured to navigate the vehicle at least in part based on data received from the sensor; and
    an assembly for cleaning the sensor, wherein the assembly includes:
        a first conductive layer over at least a portion of the sensor and a second conductive layer over at least the portion of the sensor;
        a polarity sensing circuit to determine an electrical polarity of one or more contaminants in an environment surrounding the sensor;
        a charging circuit to provide electrical charges of the electrical polarity to the first conductive layer and to the second conductive layer, where a charge provided to the first conductive layer has an opposite polarity of a charge provided to the second conductive layer thereby forming an electric field between the two conductive layers,
            wherein the first conductive layer is configured to repel the one or more contaminants away from the sensor, and the vehicle is to navigate based on data; and
        a second conductive layer over at least the portion of the sensor; and
        a piezoelectric layer between the first conductive layer and the second conductive layer, wherein the electric field causes the piezoelectric layer to vibrate.

12. The vehicle of claim 11, further comprising:
    a contaminant detector to detect the one or more contaminants.

13. The vehicle of claim 11, further comprising:
    a heating circuit to increase a temperature of the piezoelectric layer.

14. The vehicle of claim 11, wherein the piezoelectric layer includes an opening over an aperture of the sensor.

15. The vehicle of claim 11, wherein the charging circuit comprises a power supply having a positive terminal and a negative terminal, and wherein the power supply supplies the electrical charges to the conductive layer.

16. The vehicle of claim 15, wherein a voltage difference between a voltage of the positive terminal and a voltage of the negative terminal is a first electrical voltage, and the charging circuit further comprises a charge pump coupled to the power supply, the charge pump being configured and to generate a second electrical voltage that is different from the first electrical voltage.

17. The vehicle of claim 11, wherein the piezoelectric layer includes a plurality of piezoelectric elements electrically insulated from each other.

* * * * *